United States Patent
Thomas et al.

(10) Patent No.: US 9,405,645 B2
(45) Date of Patent: Aug. 2, 2016

(54) USER SUPPORT EXPERIENCE WITH AUTOMATICALLY GENERATED VIRTUAL ENVIRONMENT

(71) Applicant: Microsoft Technology Licensing, LLC, Redmond, WA (US)

(72) Inventors: Satish Thomas, Sammamish, WA (US); Yi Zhang, Bellevue, WA (US); Murtaza Chowdhury, Redmond, WA (US); Sridhar Srinivasan, Sammamish, WA (US); John Hal Howard, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 14/080,180

(22) Filed: Nov. 14, 2013

(65) Prior Publication Data

US 2015/0135013 A1 May 14, 2015

(51) Int. Cl.
| | |
|---|---|
| *G06F 9/44* | (2006.01) |
| *G06F 11/00* | (2006.01) |
| *G06F 11/22* | (2006.01) |
| *G06F 9/455* | (2006.01) |
| *G06F 11/36* | (2006.01) |

(52) U.S. Cl.
CPC .......... *G06F 11/2294* (2013.01); *G06F 9/455* (2013.01); *G06F 11/366* (2013.01); *G06F 11/3664* (2013.01)

(58) Field of Classification Search
USPC ........................................................ 717/124
See application file for complete search history.

(56) References Cited

U.S. PATENT DOCUMENTS

| | | | |
|---|---|---|---|
| 6,298,457 B1 | 10/2001 | Rachlin et al. | |
| 6,615,240 B1 * | 9/2003 | Sullivan et al. | ............... 709/205 |
| 6,658,598 B1 * | 12/2003 | Sullivan | ............. G06F 11/2294 714/25 |
| 6,742,141 B1 * | 5/2004 | Miller | ................. G06F 11/0748 706/45 |
| 7,308,492 B2 * | 12/2007 | Konopka | ................ H04L 29/06 709/201 |
| 8,219,653 B1 | 7/2012 | Keagy et al. | |
| 8,776,028 B1 * | 7/2014 | Enakiev | ............. G06F 11/3664 714/38.11 |
| 2007/0143357 A1 | 6/2007 | Chaudhri | |
| 2008/0172574 A1 * | 7/2008 | Fisher | ............................. 714/25 |
| 2009/0150291 A1 * | 6/2009 | Anson | ............................. 705/51 |
| 2010/0106542 A1 * | 4/2010 | Green | ............. G06Q 10/06395 705/7.41 |
| 2014/0149980 A1 | 5/2014 | Vittal et al. | |
| 2015/0082291 A1 * | 3/2015 | Thomas | .................... G06F 8/65 717/168 |
| 2015/0082292 A1 * | 3/2015 | Thomas | .................... G06F 8/65 717/168 |

(Continued)

OTHER PUBLICATIONS

"Customer Support Options for Microsoft Products Running within VMware Virtual Machines", Published on: Jan. 24, 2009, Available at: http://www.vmware.com/support/policies/ms_support_statement.html.

(Continued)

*Primary Examiner* — Marina Lee
(74) *Attorney, Agent, or Firm* — Thomas Marquis; Kate Drakos; Micky Minhas

(57) ABSTRACT

A virtual environment service obtains automatically collected diagnostic information from a deployed instance of a computer system and automatically generates a reproduction of an environment of the instance of the computer system, based upon the collected diagnostic data. User interactions with the virtual diagnostic environment can be recorded to identify a technical issue with the deployed instance of the computer system. A fix for the issue is applied in the virtual diagnostic environment so that it can be verified by the user prior to applying it to the deployed instance.

20 Claims, 40 Drawing Sheets

(56) References Cited

U.S. PATENT DOCUMENTS

| | | | | |
|---|---|---|---|---|
| 2015/0082293 A1* | 3/2015 | Thomas | ................... | G06F 8/65 717/168 |
| 2015/0082296 A1* | 3/2015 | Thomas | ................... | G06F 8/65 717/171 |
| 2015/0135013 A1* | 5/2015 | Thomas et al. | ................. | 714/27 |

OTHER PUBLICATIONS

"Gen-E Tivoli Support Services", Published on: Oct. 16, 2013, Available at: http://www.gen-e.com/gen-E_Tivoli_SLA.pdf.

"What's New in VMware vCloud™ Director 1.5", Published on: Jul. 25, 2011, Available at: http://www.vmware.com/files/pdf/techpaper/Whats-New-VMware-vCloud-Director-15-Technical-Whitepaper.pdf.

"VMware Technical Support Welcome Guide", Published on: Jun. 2013, Available at: http://www.vmware.com/files/pdf/support/tech_support_guide.pdf.

"Technical Support Service Description", Published on: Oct. 1, 2013, Available at: http://www.ipanematech.com/uploads/editor/file/TechnicalSupport_ServiceDescription.pdf Resources.

"Welcome to RSA Technical Support", Published on: Nov. 14, 2011, Available at: http://www.computerlinks.fr/FMS/12835.customer_guide_to_rsa_technical_support.pdf.

International Search Report and Written Opinion for International Application No. PCT/US2014/065100, date of mailing: Feb. 4, 2015, date of filing: Nov. 12, 2014, 9 pages.

International Preliminary Report on Patentability for International Application No. PCT/US2014/065100, date of mailing: Jun. 26, 2015, date of filing: Nov. 12, 2014, 11 pages.

* cited by examiner

←  →

🔶 https://

File  Edit  View  Favorites  Tools  Help

Issues > New issue - Environment

⬨ New ⟩⟩ Repro ⟩⟩ Active ⟩⟩ Verify ⟩⟩ Closed

Title*
Sales tax ledger posting group for Accounts Receivable

Topic  Accounts Receivable ⌄  /372  Topic  Ledger Posting Group ⌄

Severity*  C ⌄  /374  Severity description

Issue description*

Actual vs. expected result*

Symptoms that led to the submission of this issue

🔍 Issue Search  /368

/382

Does the issue concern a production server that
is currently down, or do you have a loss of a
system that is creating a critical work stoppage?   Yes ⌄

If this issue cannot be resolved during regular
business hours, will you and your staff be able to
work the issues at any hour?   Yes ⌄

The severity has been set to CRITICAL. Do
you agree this severity is appropriate and
someone will be available immediately and
potentially 24 hours per day until resolved?   Yes ⌄

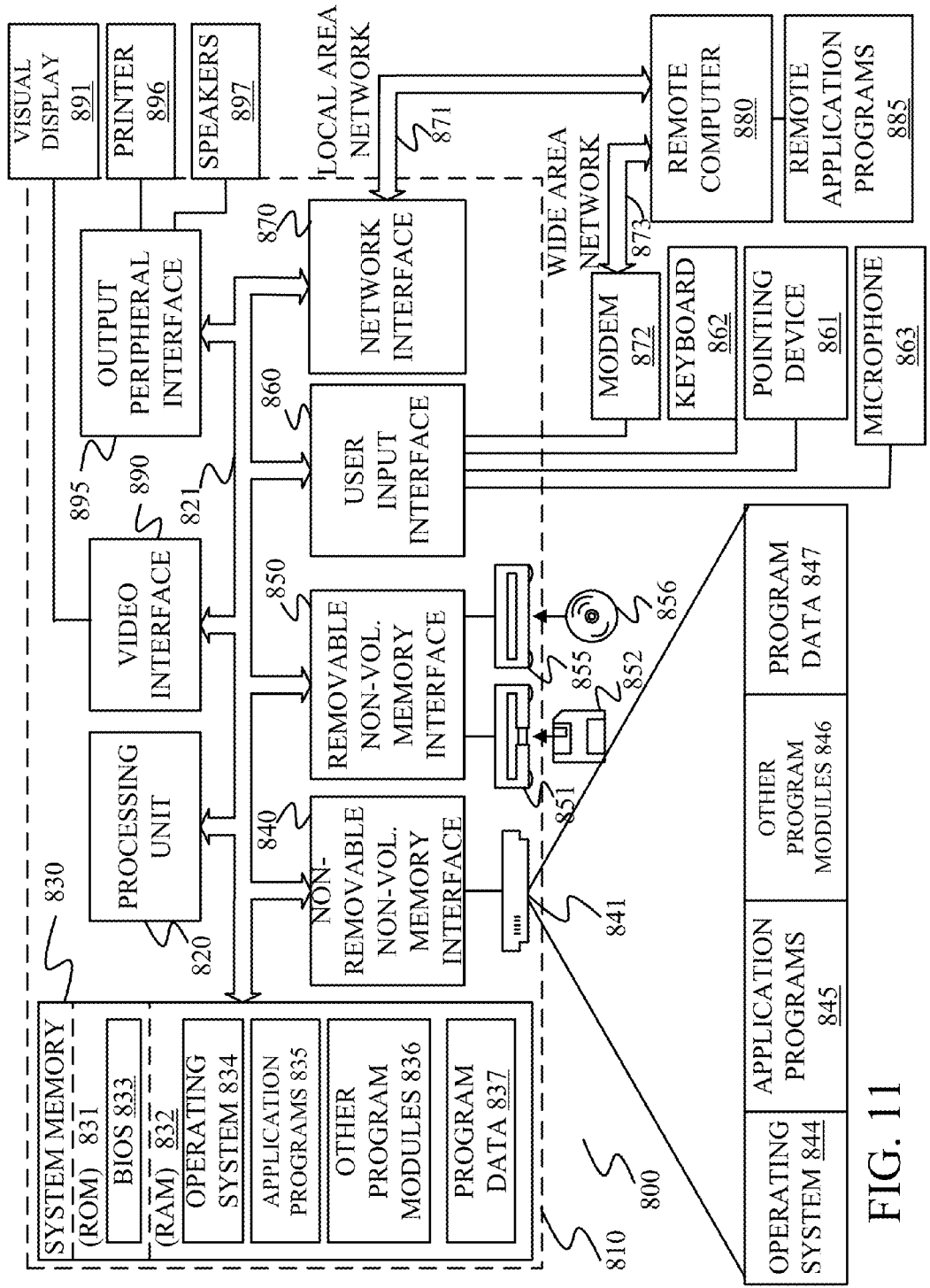

USER SUPPORT EXPERIENCE WITH AUTOMATICALLY GENERATED VIRTUAL ENVIRONMENT

BACKGROUND

Many types of computer systems are currently in wide use. Some such systems are large, and can include thousands of different forms and many different workflows, as well as a large number of different data models, among other things.

Some such computer systems include business systems, such as enterprise resource planning (ERP) systems, customer relations management (CRM) systems, line-of-business (LOB) systems, database systems, among many others. These types of systems are often customized, and some heavily customized, when they are deployed within an organization.

For example, a software manufacturer may provide a base computer system that is subsequently modified by developers, such as value added resellers and independent software vendors. The modified version of the computer system may then be ultimately implemented within an organization (such as a business). The computer system is often further modified during implementation. Also, once the computer system is finally deployed, it may be even further modified over time. For instance, the end users (or their administrators) may download fixes, cumulative updates, or make other modifications, customizations or extensions to the computing environment where the computing system is deployed. This often results in every instance of the computer system being unique, because the ultimate implementation can be very tightly coupled to the customer, industry, region and mode of operation of a given enterprise.

This can lead to challenges when a user of the computer system attempts to obtain technical support in order to address an issue with the computer system. Currently, the support experience for a user can be quite cumbersome and time consuming While the support experience can take many forms, one common form involves the user first calling a technical support person by telephone. The user is connected with a support engineer who often asks the user a variety of different questions in order to obtain some idea of the symptoms of the technical issue that the user is encountering. This is done so the support engineer can attempt to reproduce the problem so that it can be fixed.

Such computer systems are often so complex that just reproducing the problem can be very difficult. The amount of information that is normally needed in order to accurately reproduce the problem can be very large. Often, this information is not all gathered during the initial telephone discussion. Instead, the support personnel follow up with the user by having additional telephone calls, and by communicating in other ways. Often, this phase of the support experience involves many electronic mail exchanges between the user and the support personnel, simply in order to clarify the exact nature of the problem, and in order to reproduce the environment that the user has, so the problem can be addressed by the technical support personnel.

Once the support engineer is finally able to reproduce the problem, it is described and often sent to a different development team in order to generate a fix for the problem. The developers that are attempting to fix the problem may need even more information from the user that reported the problem, which results in more clarifying communications between the user and the developer. When the developer finally believes that he or she has developed a fix for the problem, the user is notified (often by e-mail) that a fix has been developed, and that it can be applied by the user.

Sometimes, even after the fix is applied by the user, it fails to fix the problem that the user reported. Thus, the entire process (or at least parts of it) are repeated. This can be quite frustrating for the user.

The discussion above is merely provided for general background information and is not intended to be used as an aid in determining the scope of the claimed subject matter.

SUMMARY

A virtual environment service obtains automatically collected diagnostic information from a deployed instance of a computer system and automatically generates a reproduction of an environment of the instance of the computer system, based upon the collected diagnostic data. User interactions with the virtual diagnostic environment can be recorded to identify a technical issue with the deployed instance of the computer system. A fix for the issue is applied in the virtual diagnostic environment so that it can be verified by the user prior to applying it to the deployed instance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 11 is a block diagram of one illustrative computing environment.

DETAILED DESCRIPTION

Figure 1A:
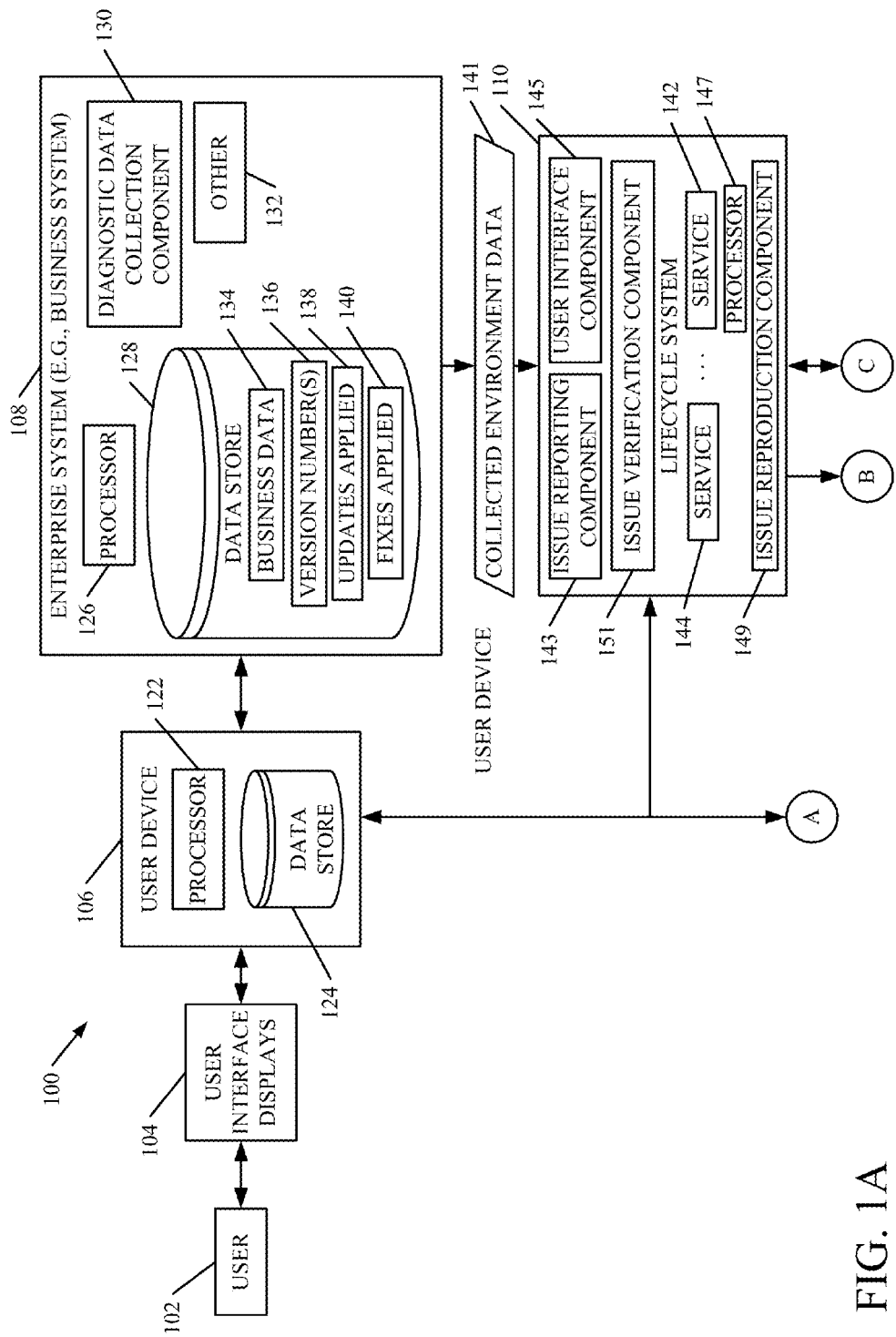
FIGS. 1A and 1B (collectively FIG. 1) is a block diagram of one illustrative support architecture.
Figure 1B:
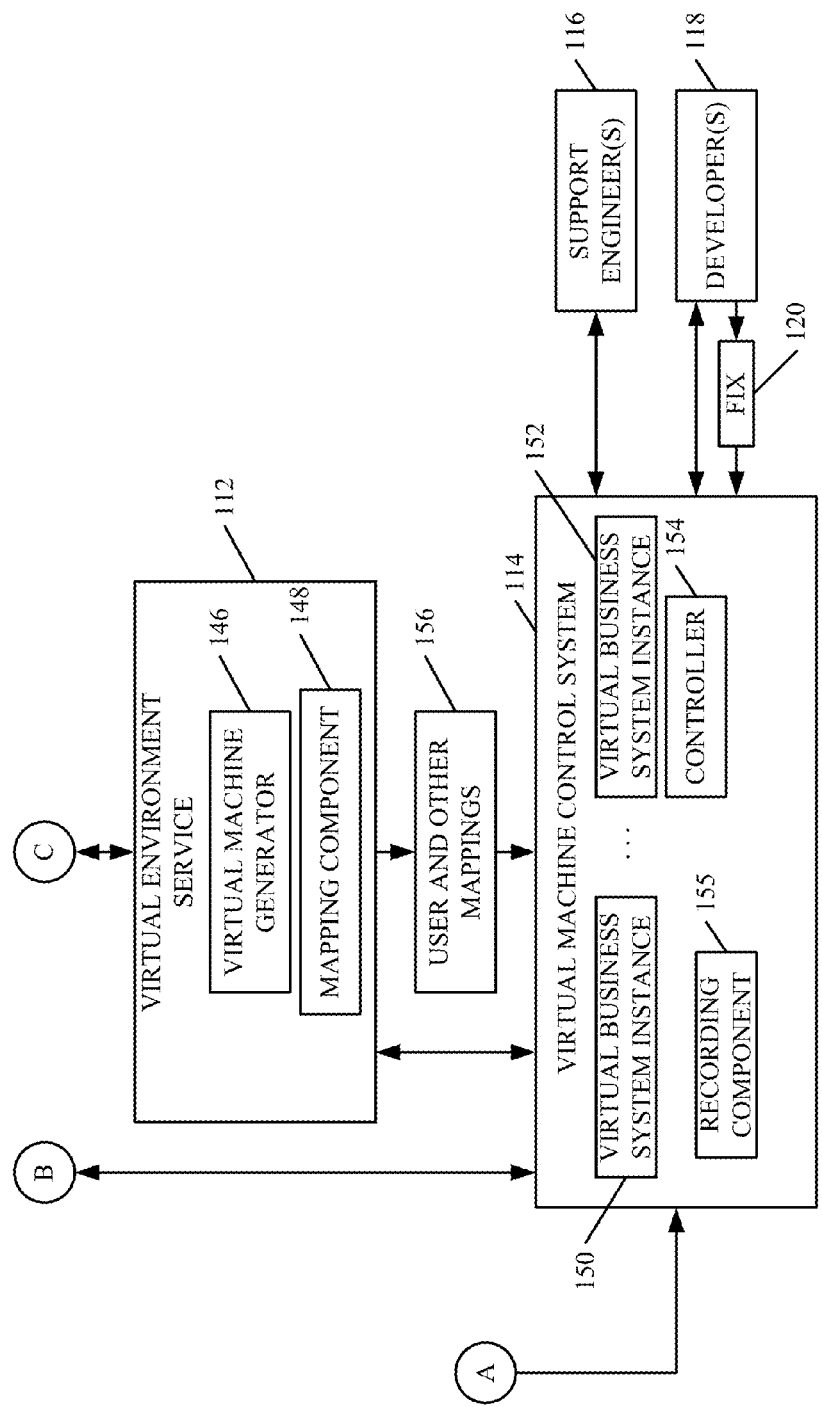
Figure 3A:
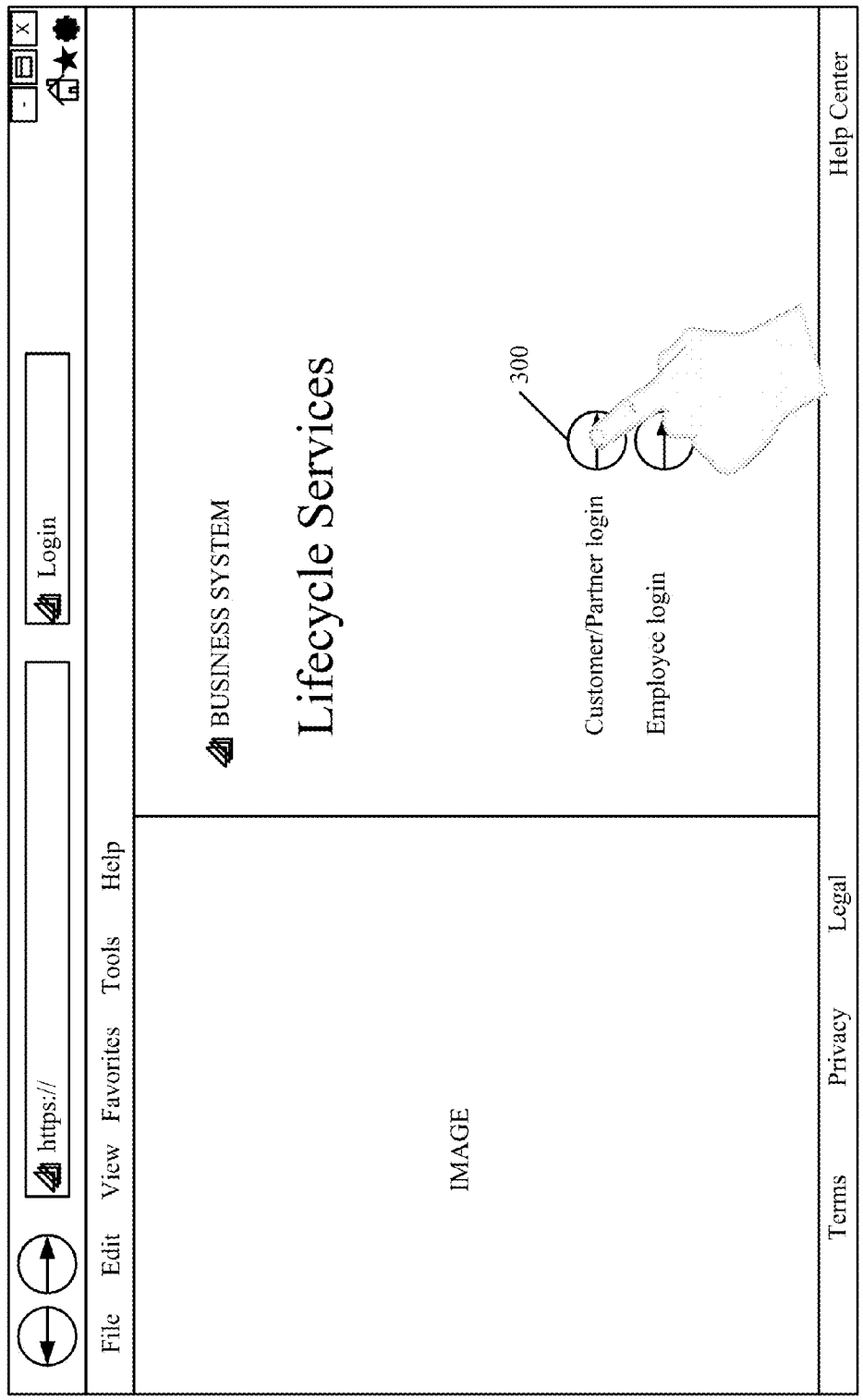
FIGS. 3A-3Z-1 show exemplary user interface displays that can be generated.
Figure 3B:
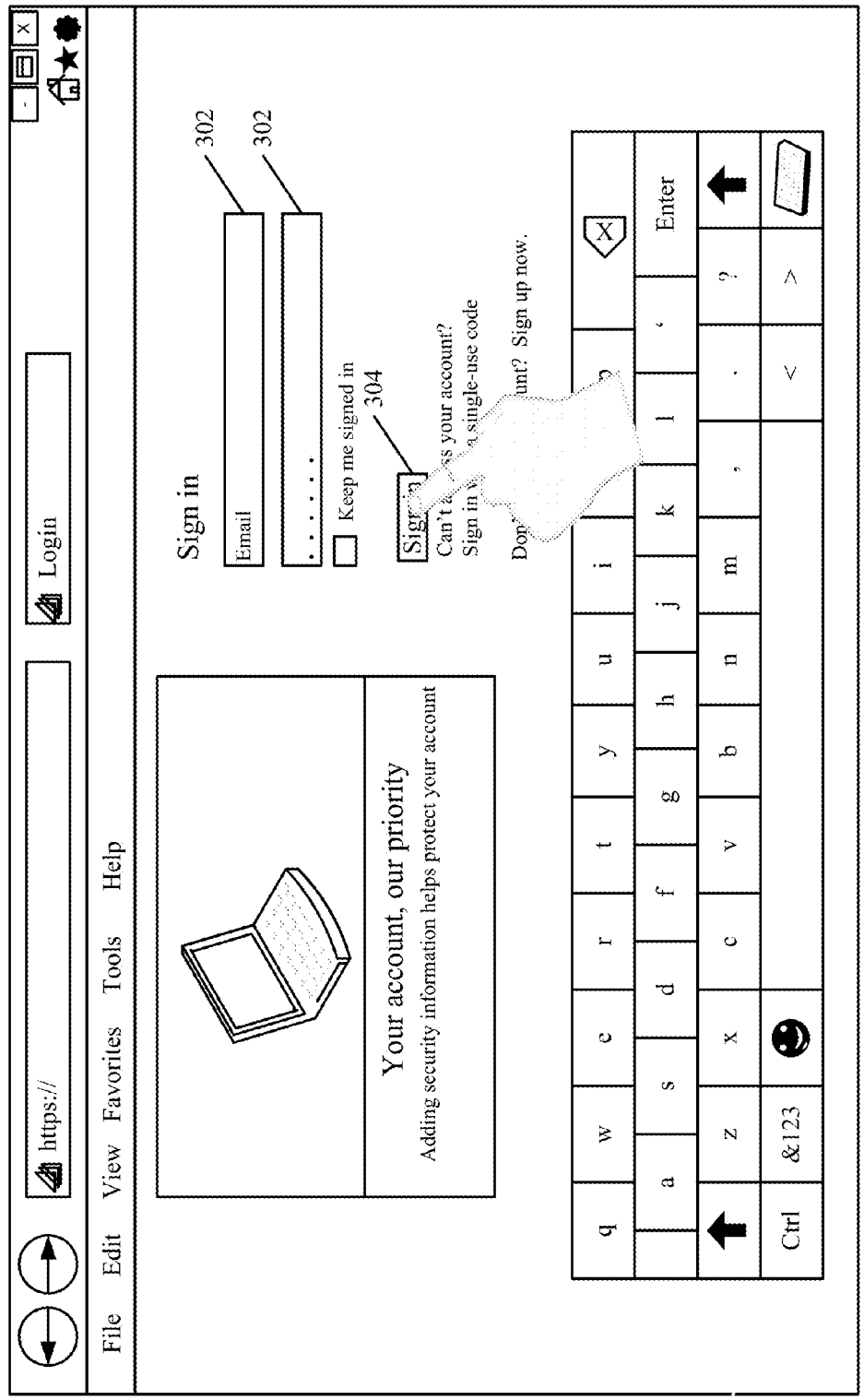
Figure 3C:
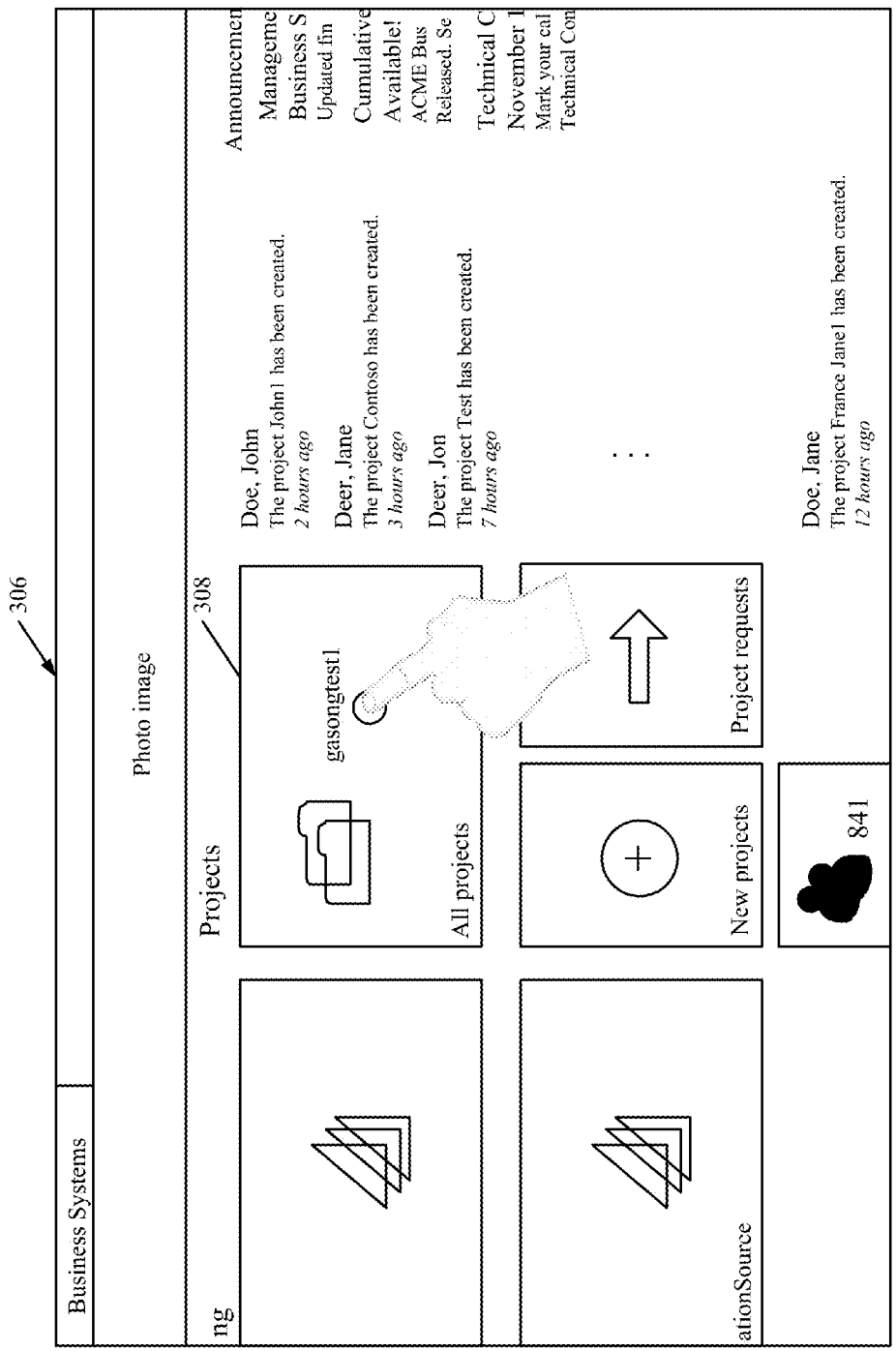
Figure 3D:
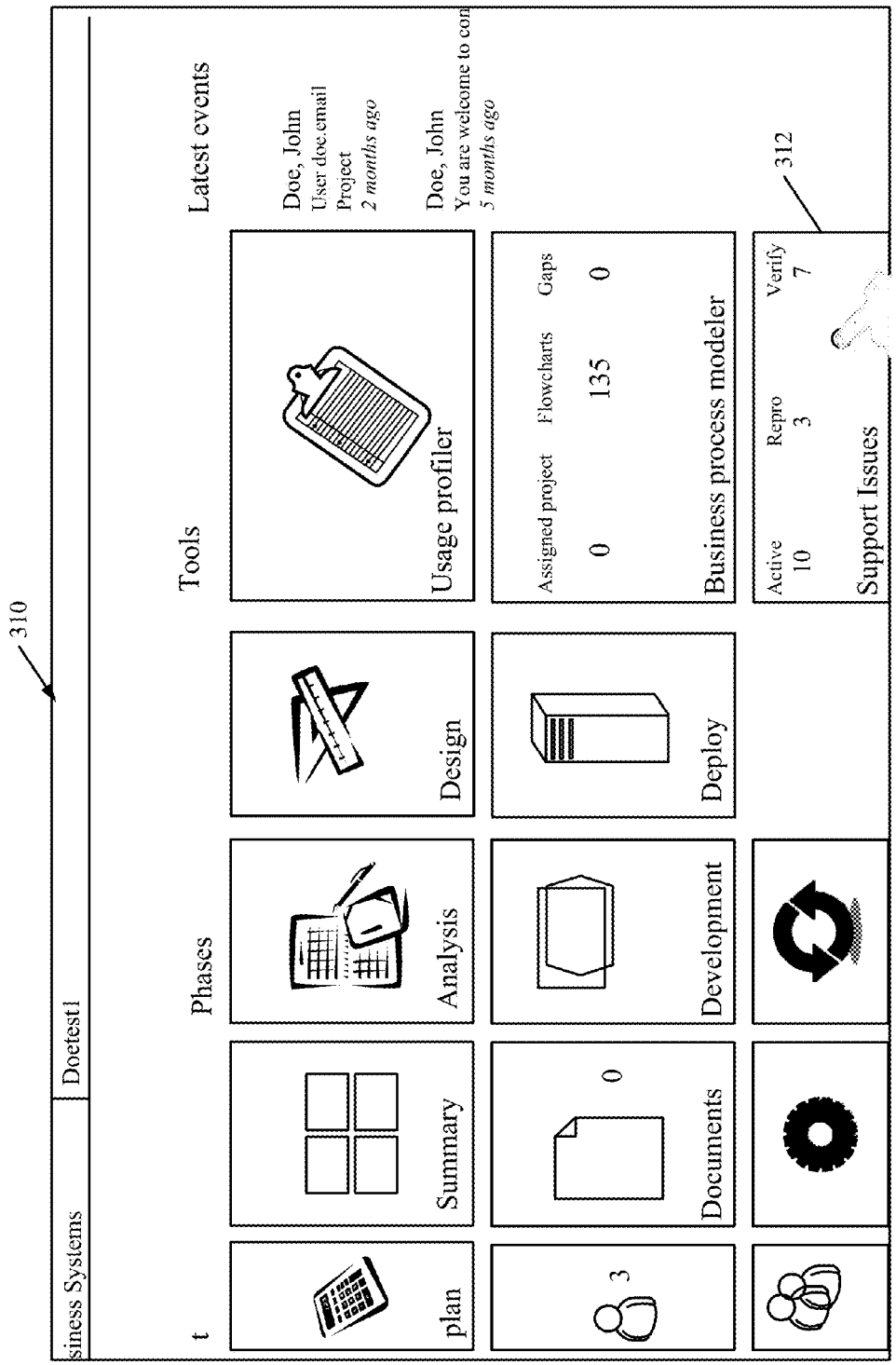
Figure 3E:
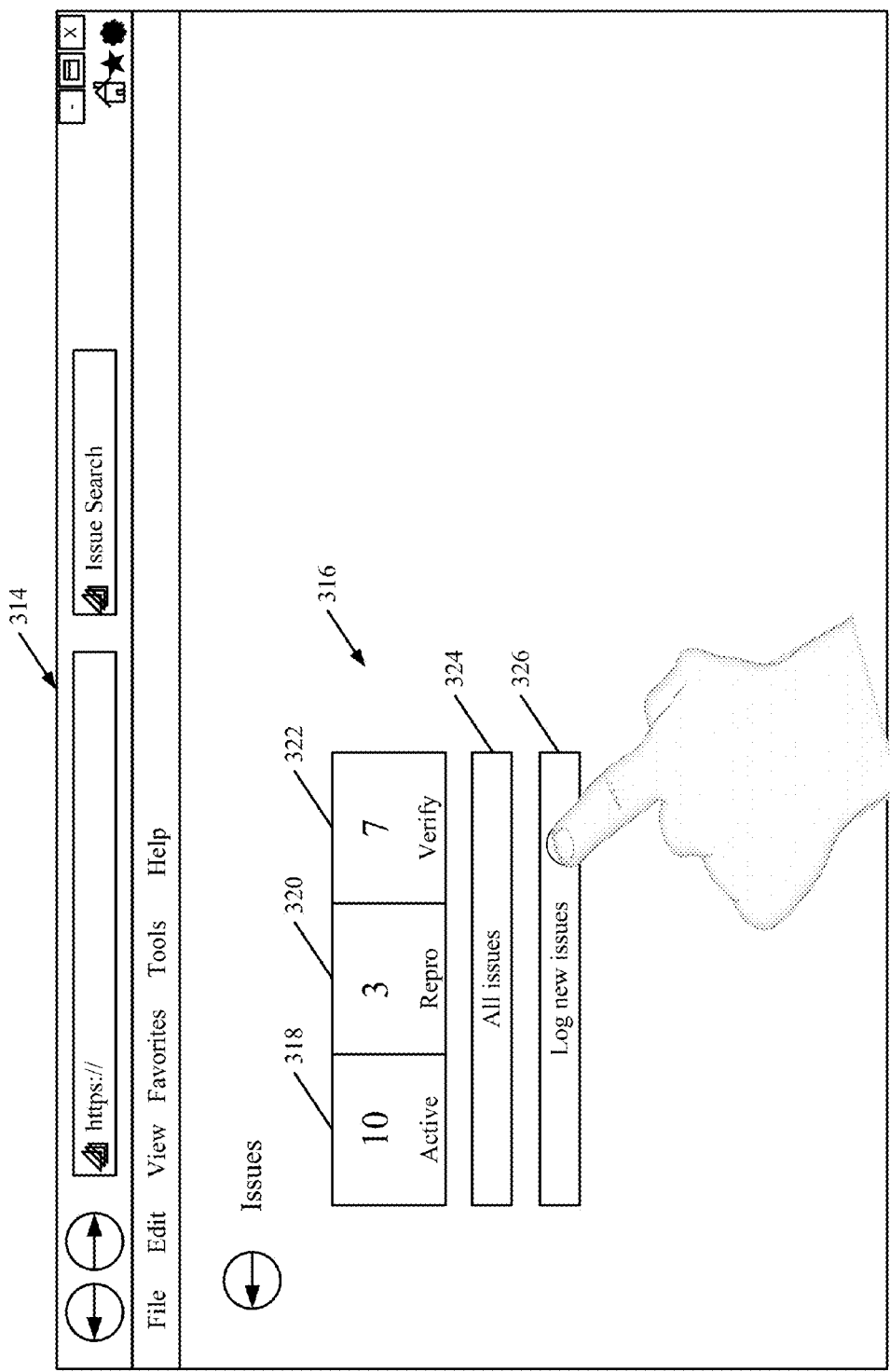
Figure 3F:
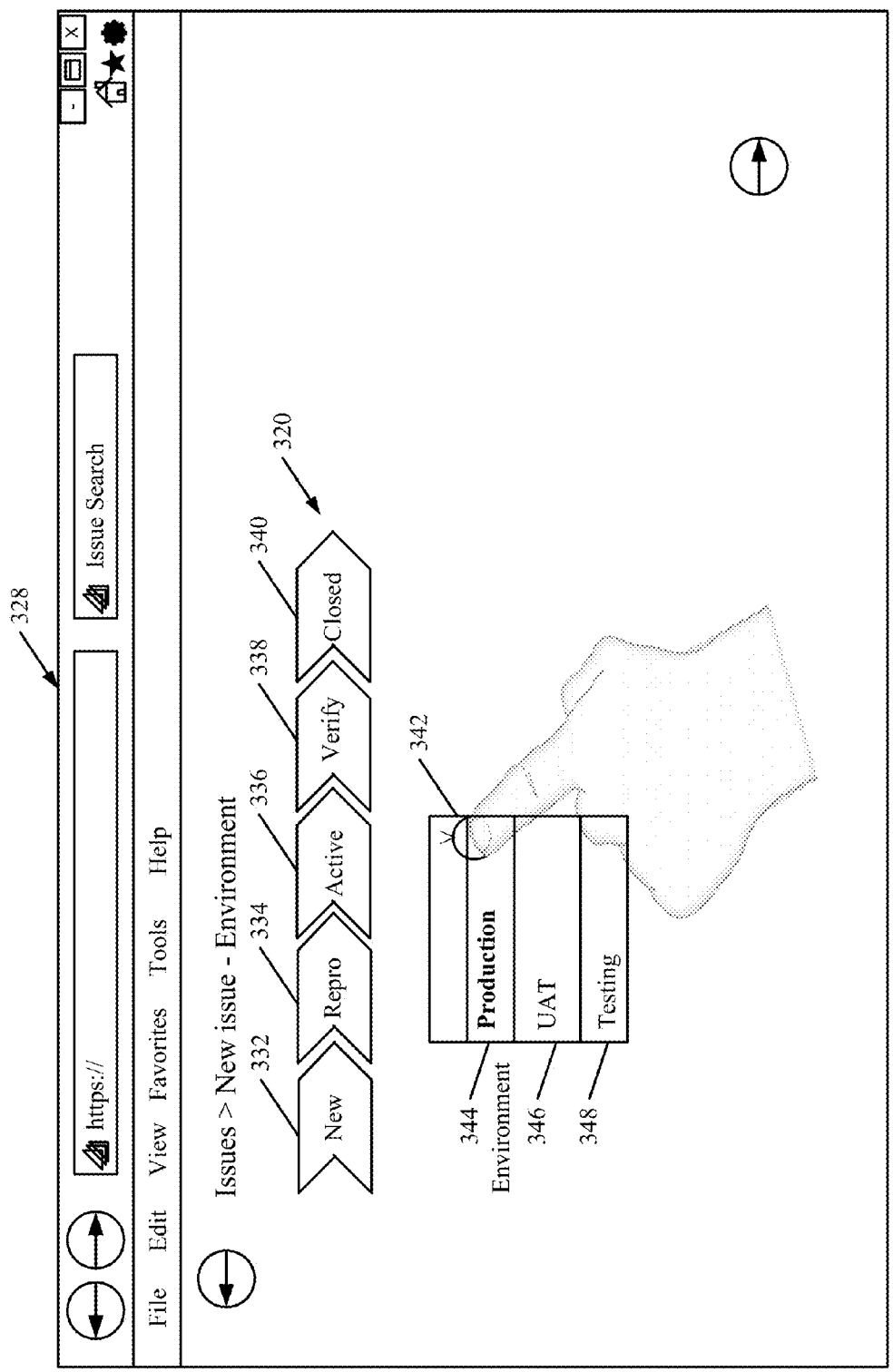
Figure 3G:
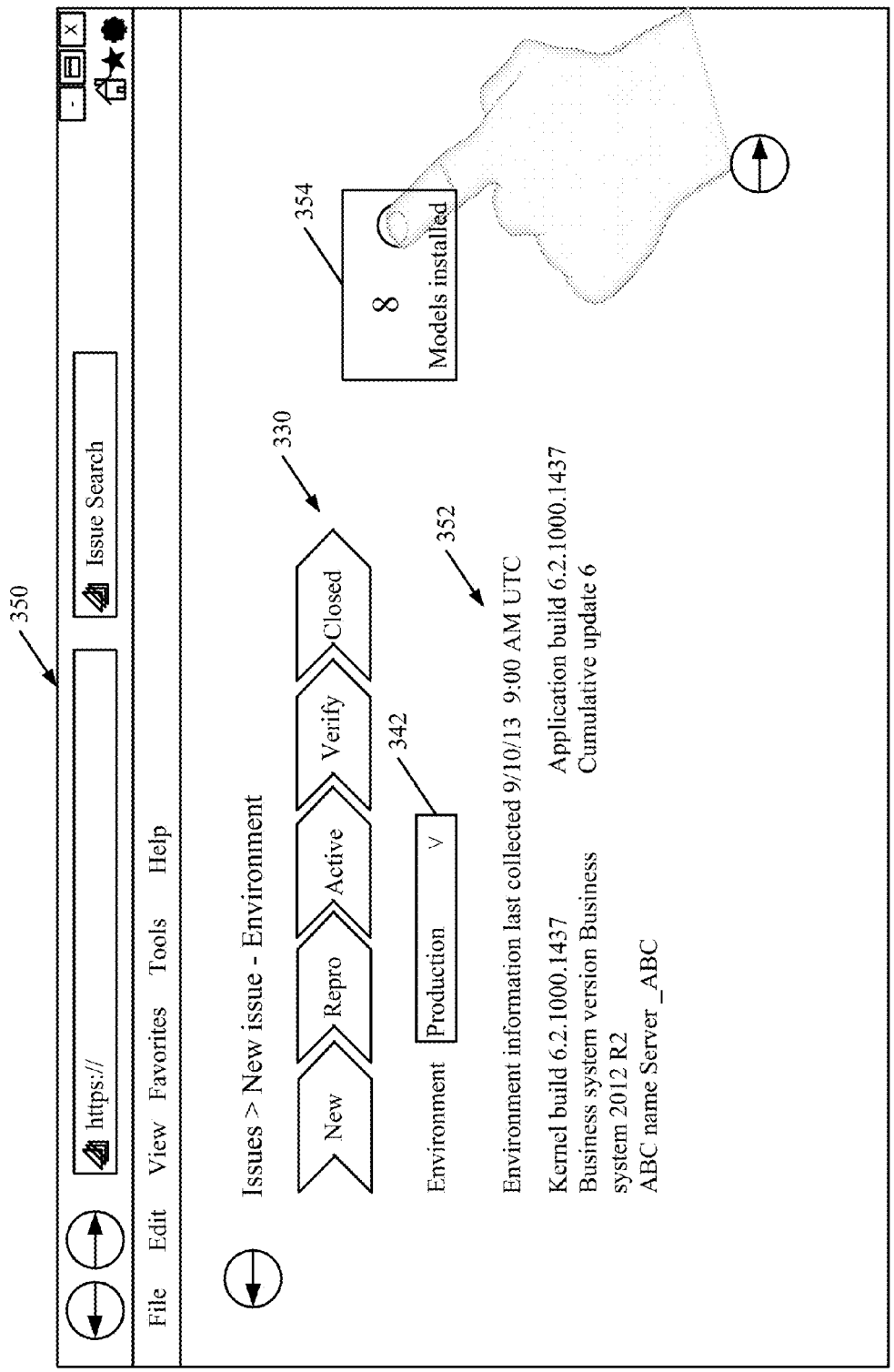
Figure 3H:
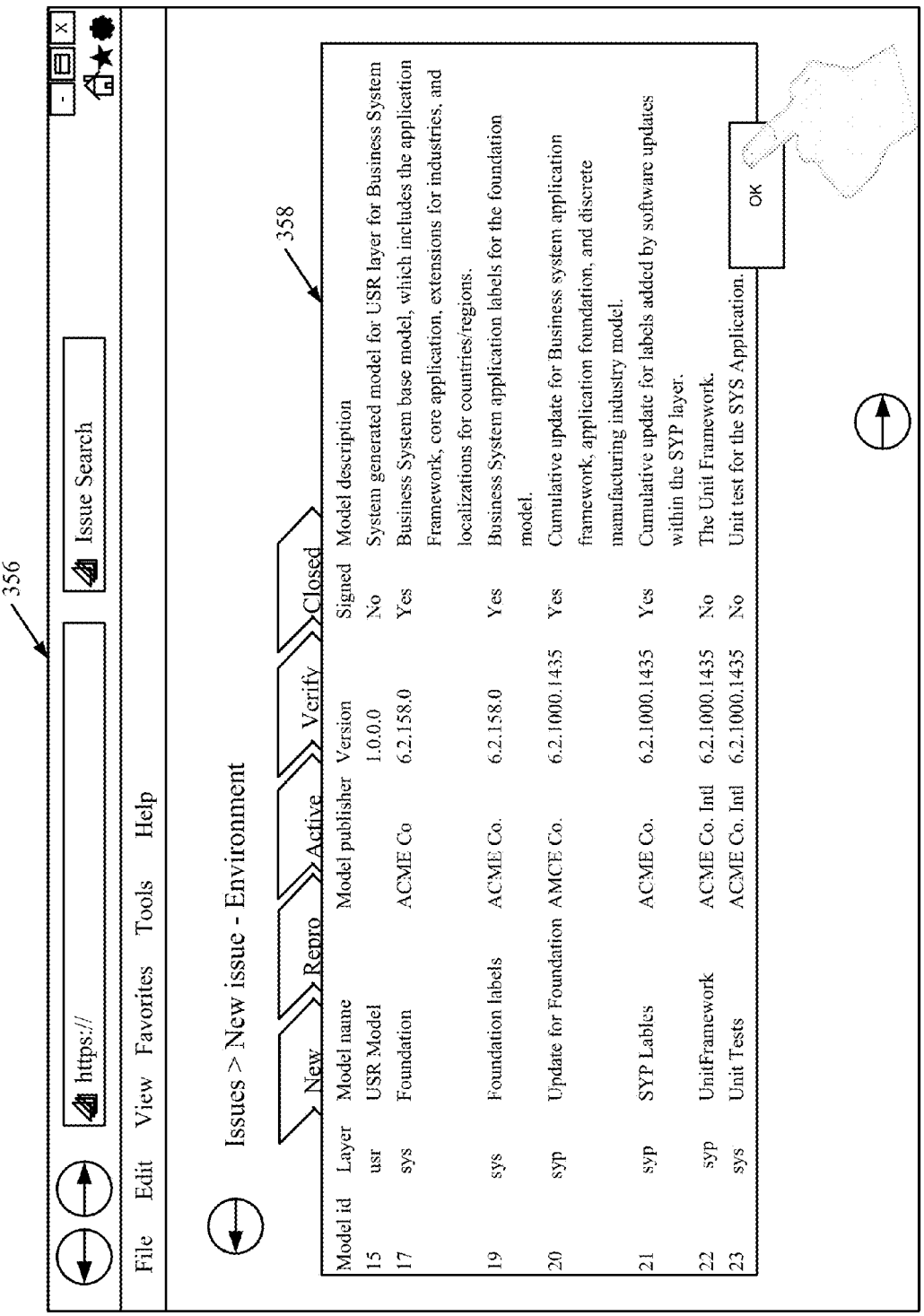
Figure 3I:
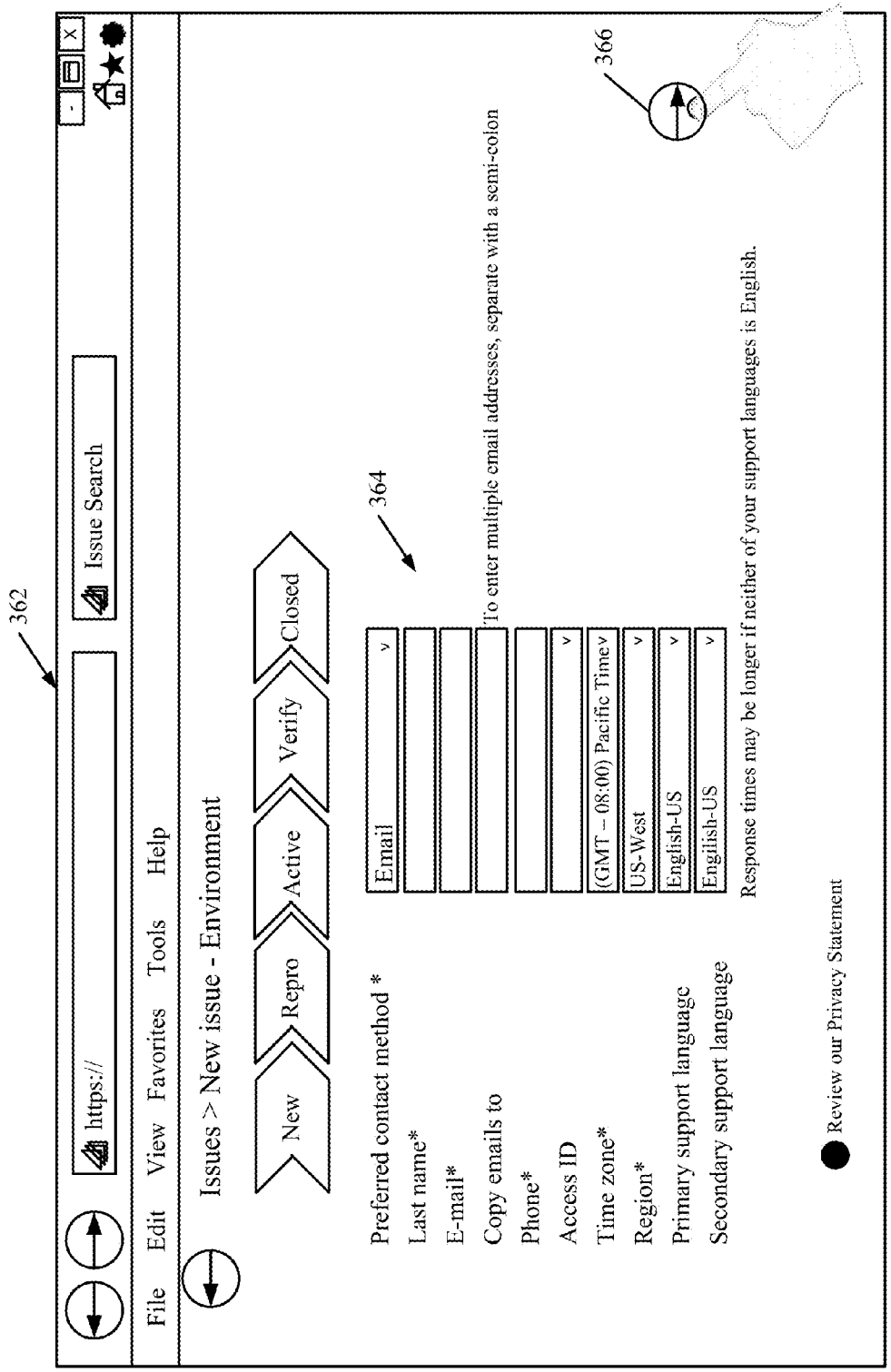
Figure 3K:
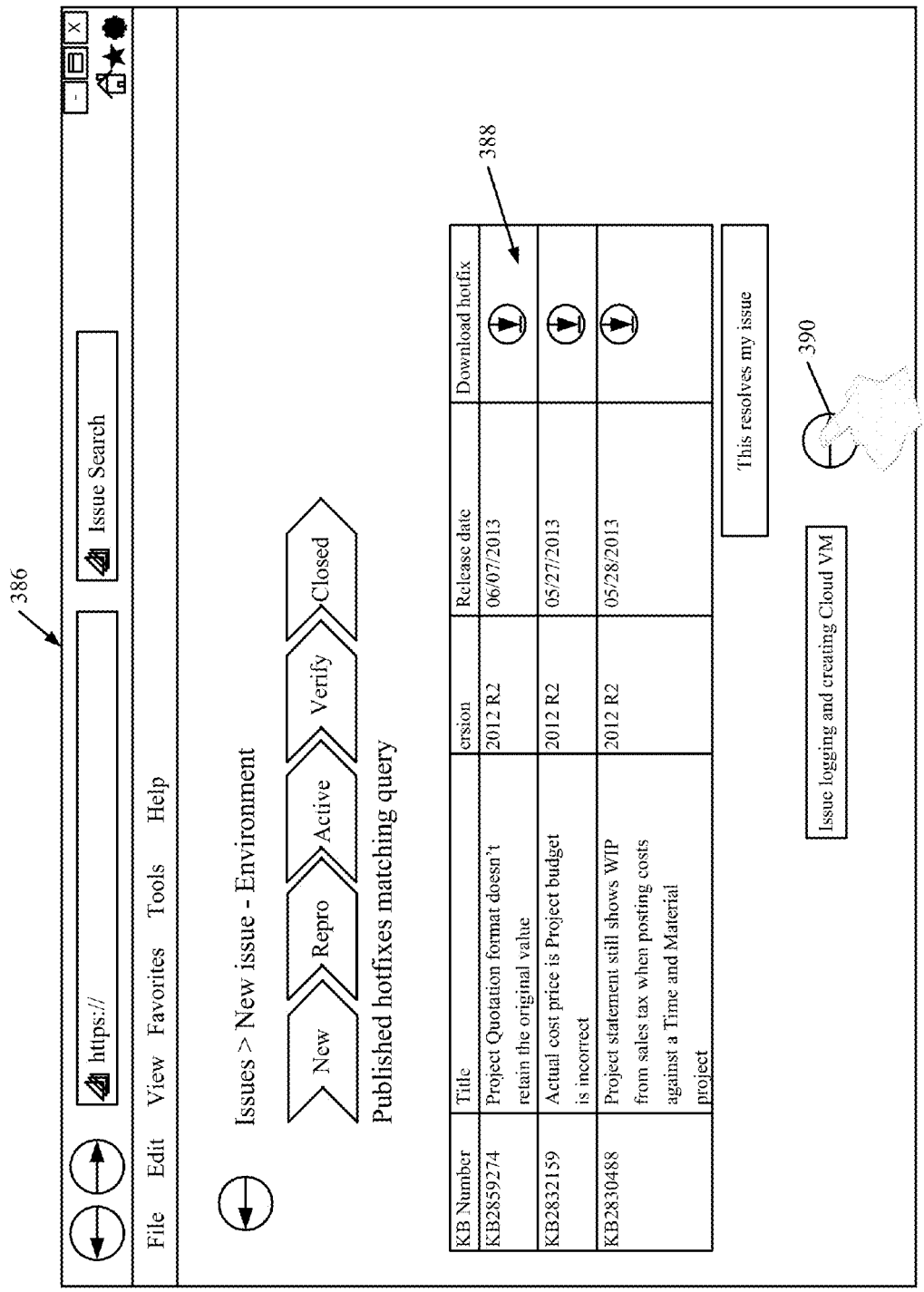
Figure 3L:
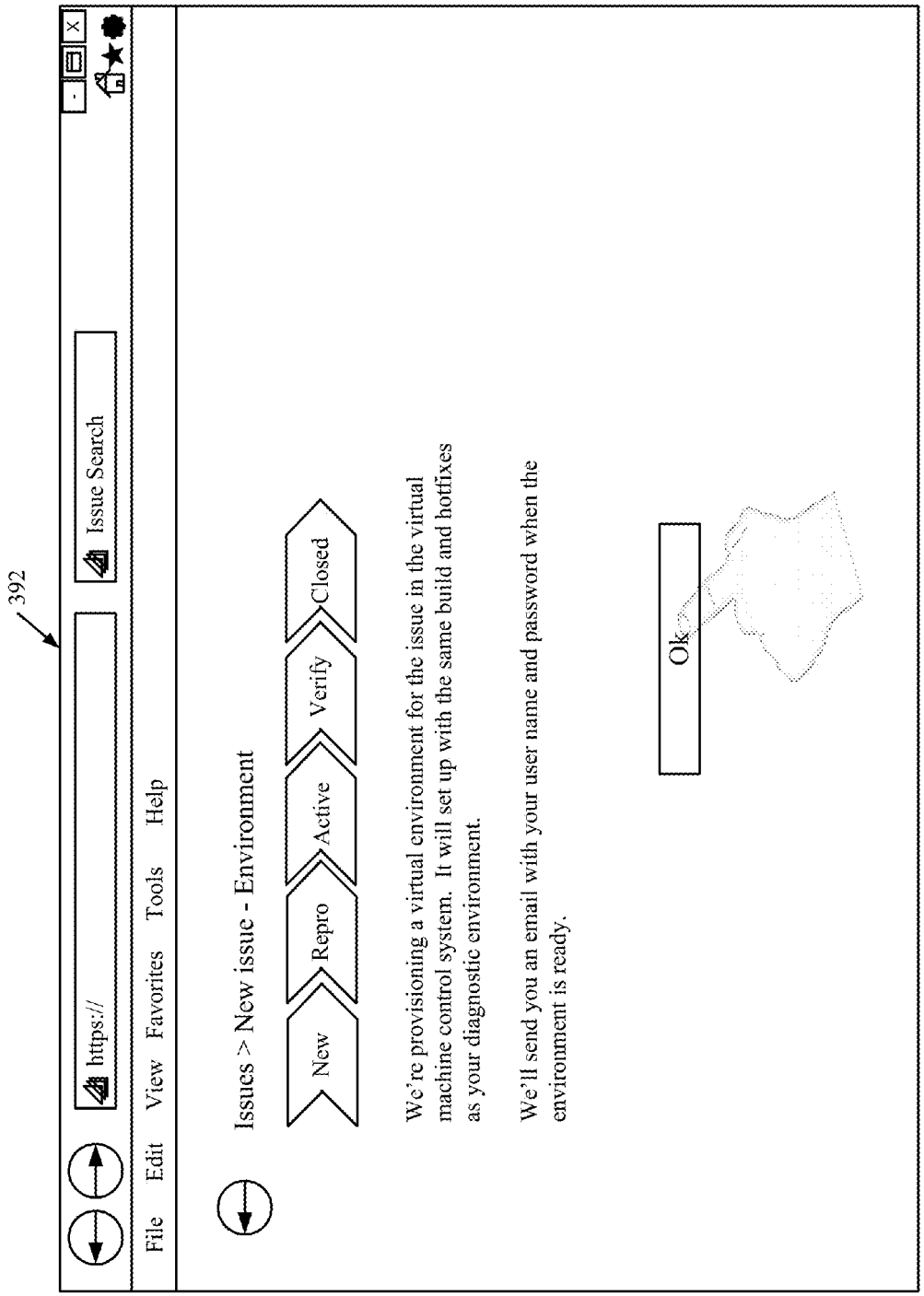
Figure 3M:
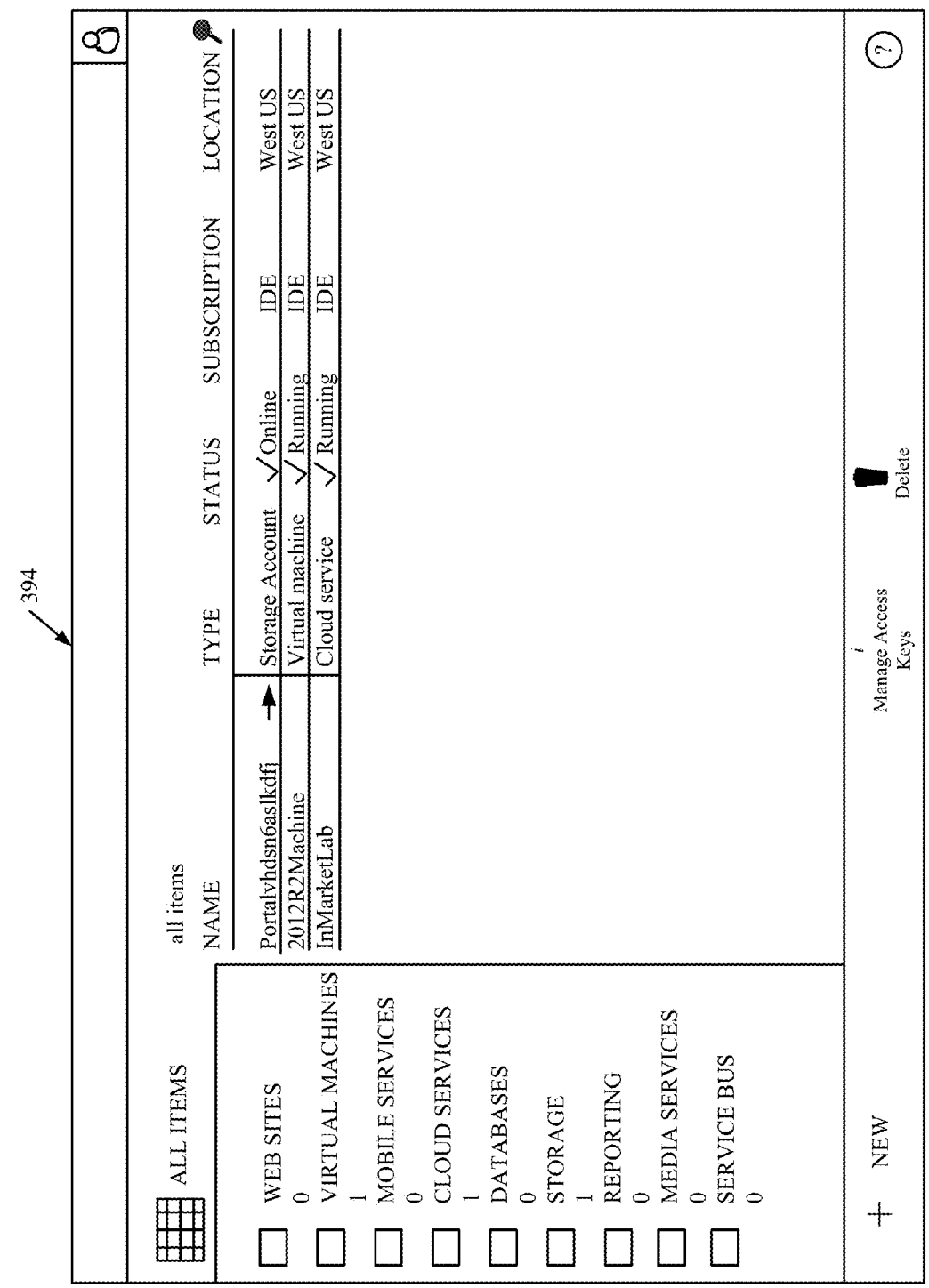
Figure 3N:
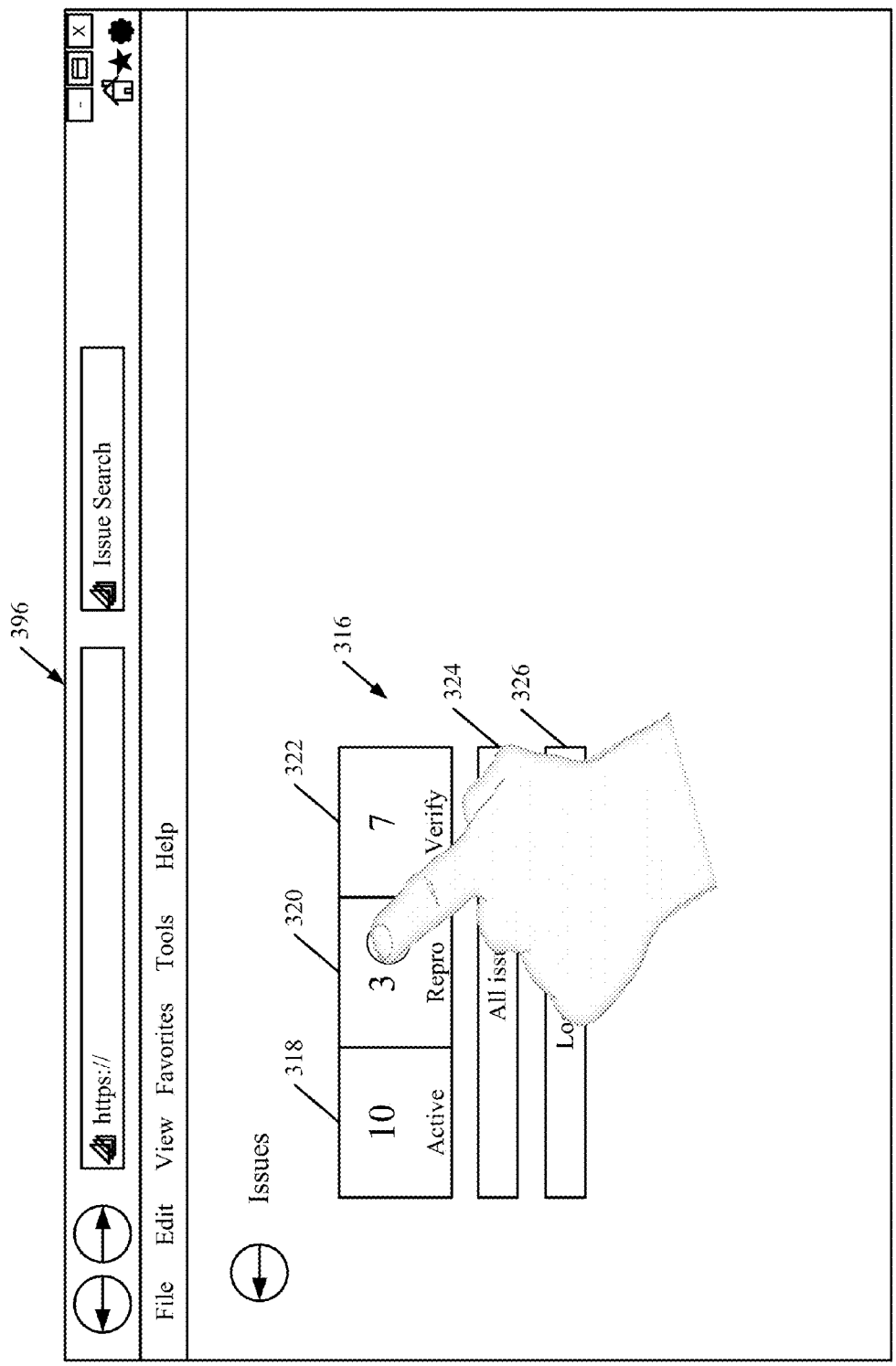
Figure 30:
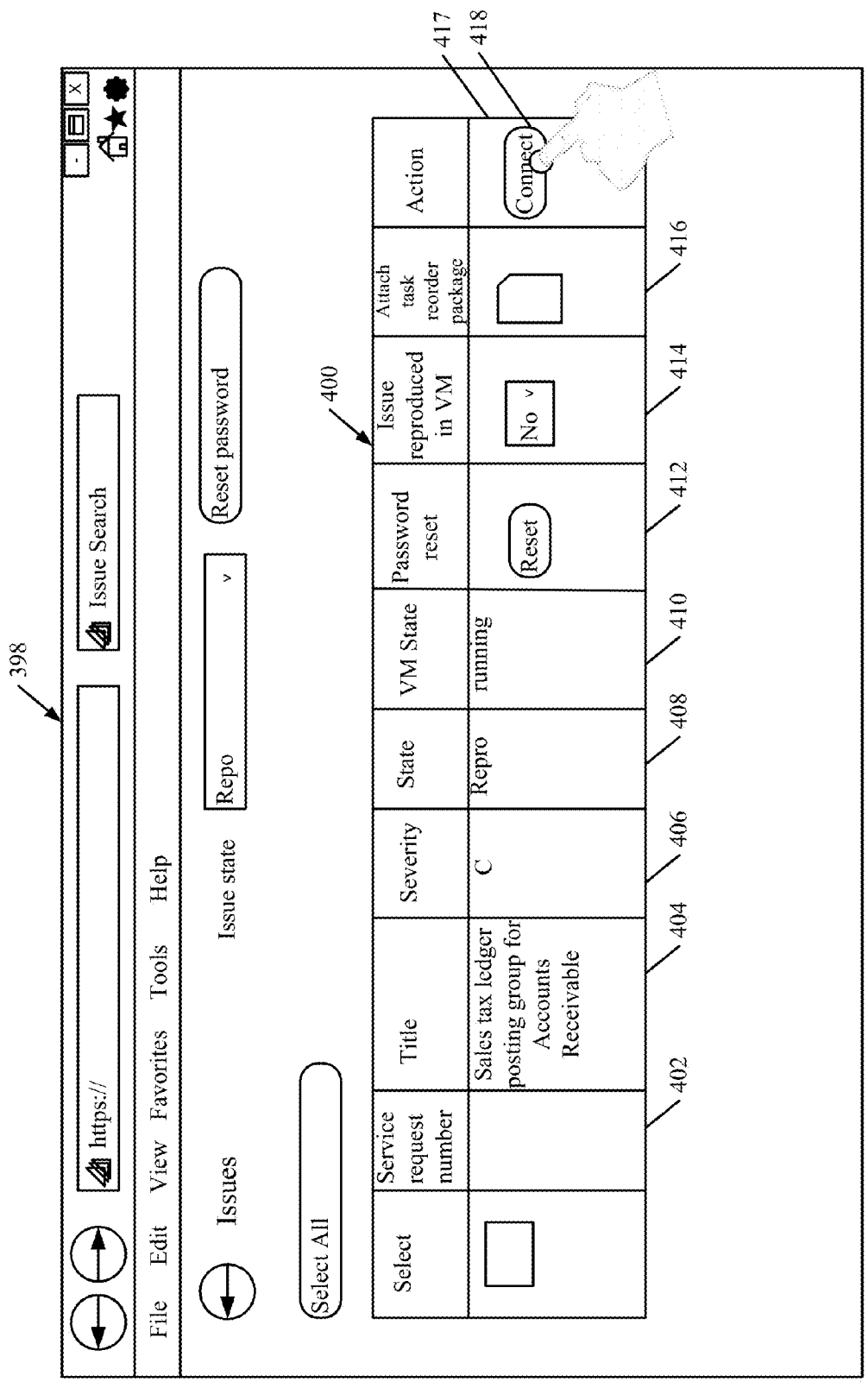
Figure 3P:
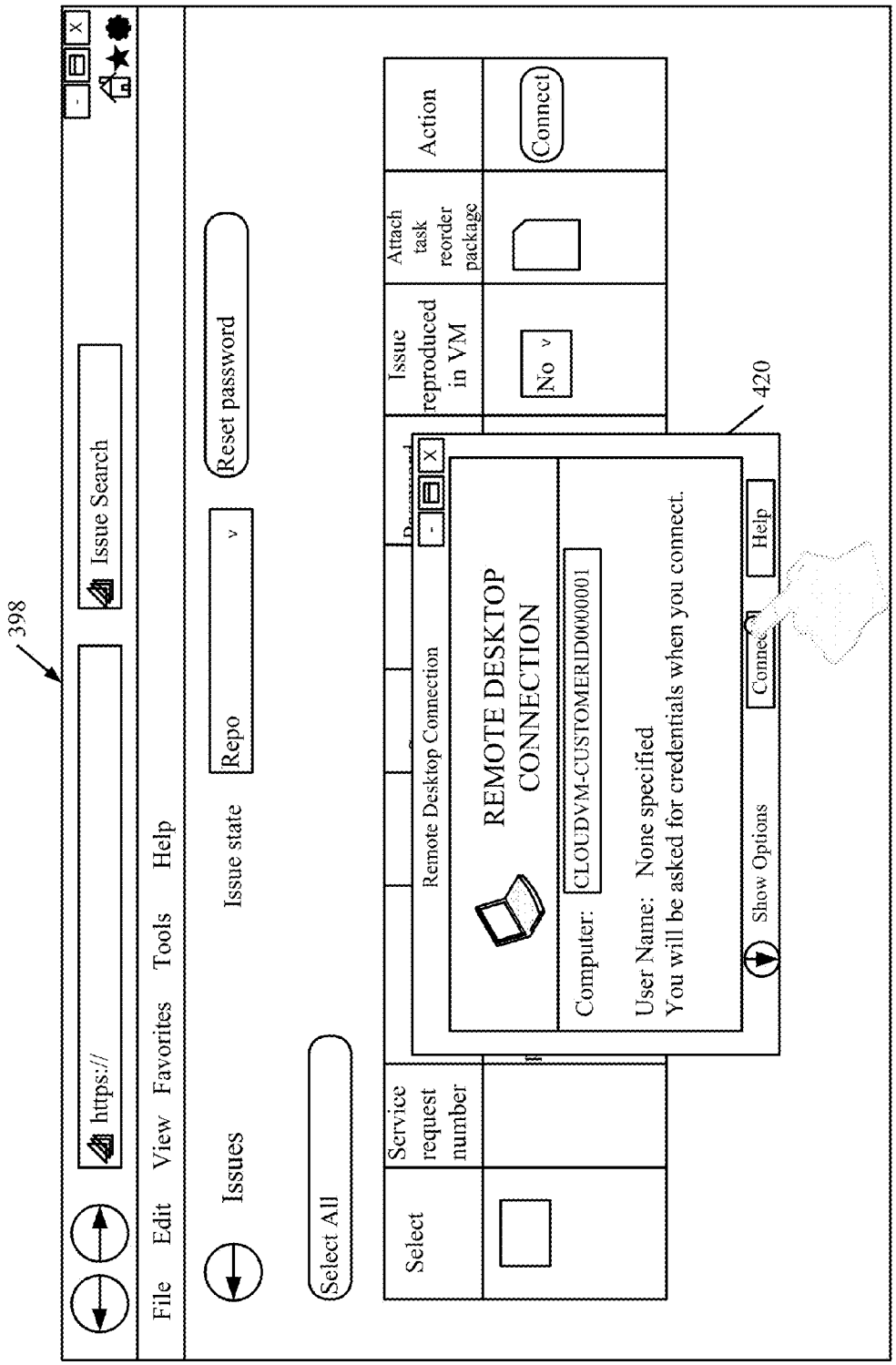
Figure 3Q:
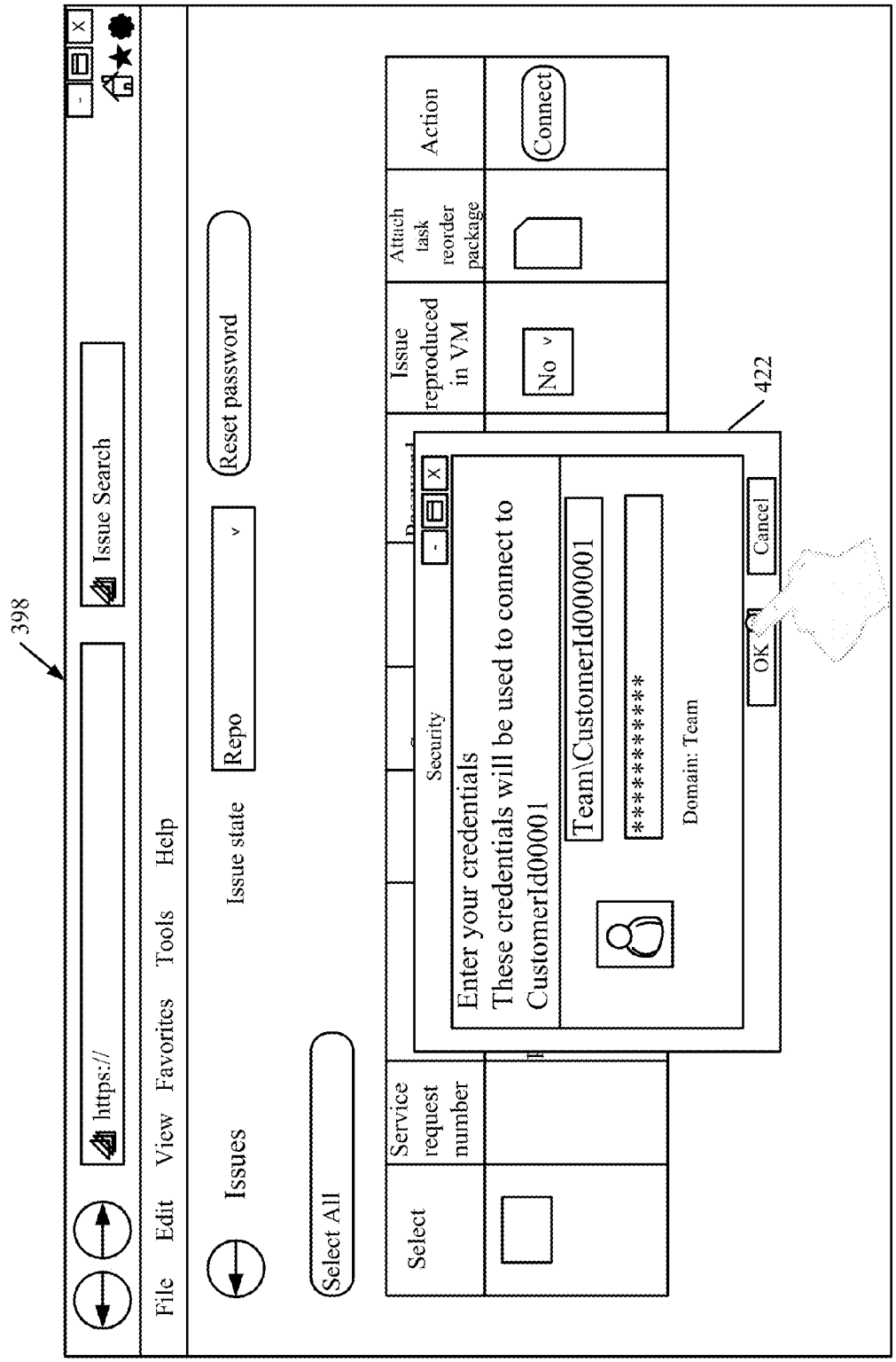
Figure 3R:
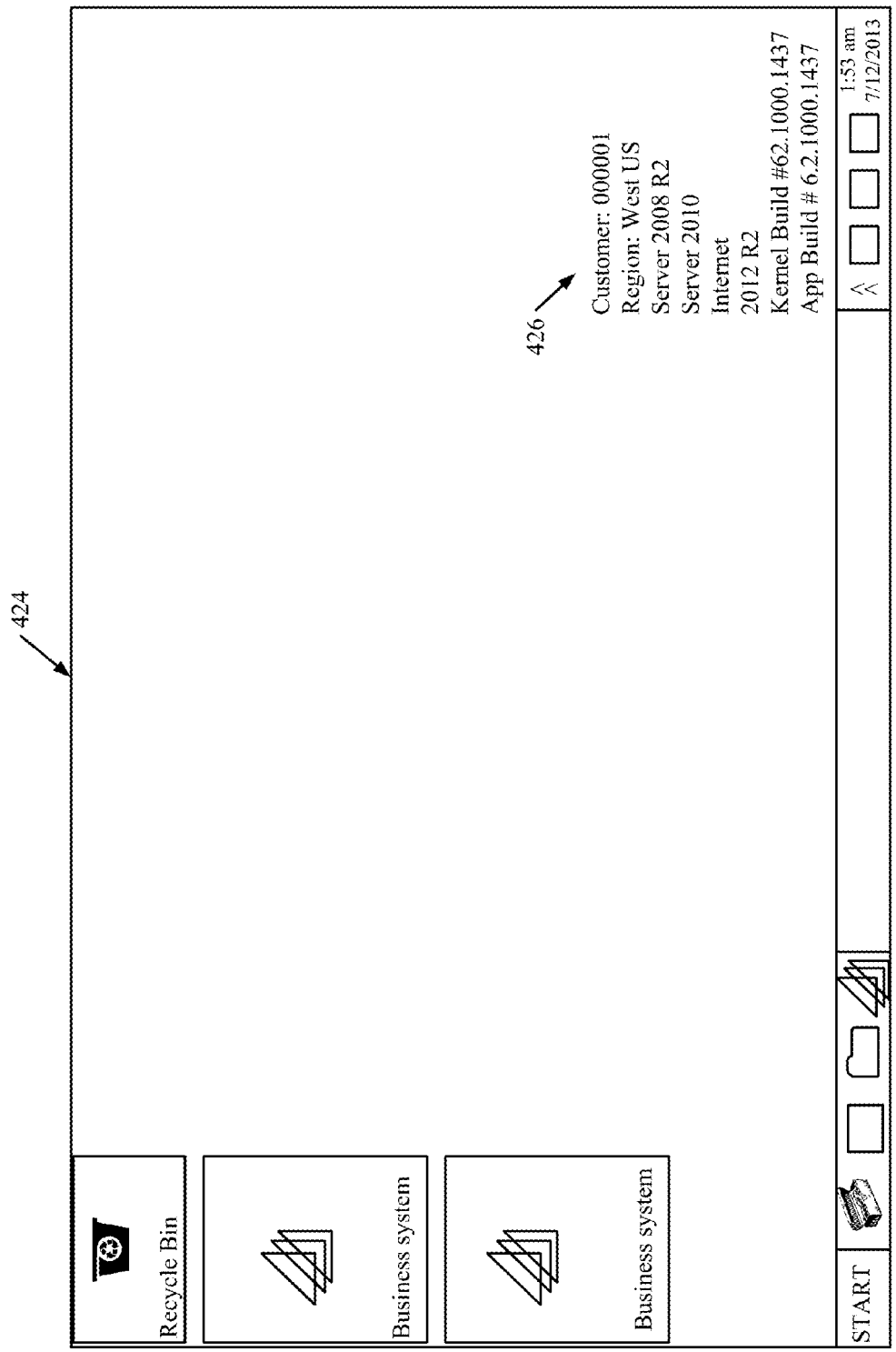
Figure 3S:
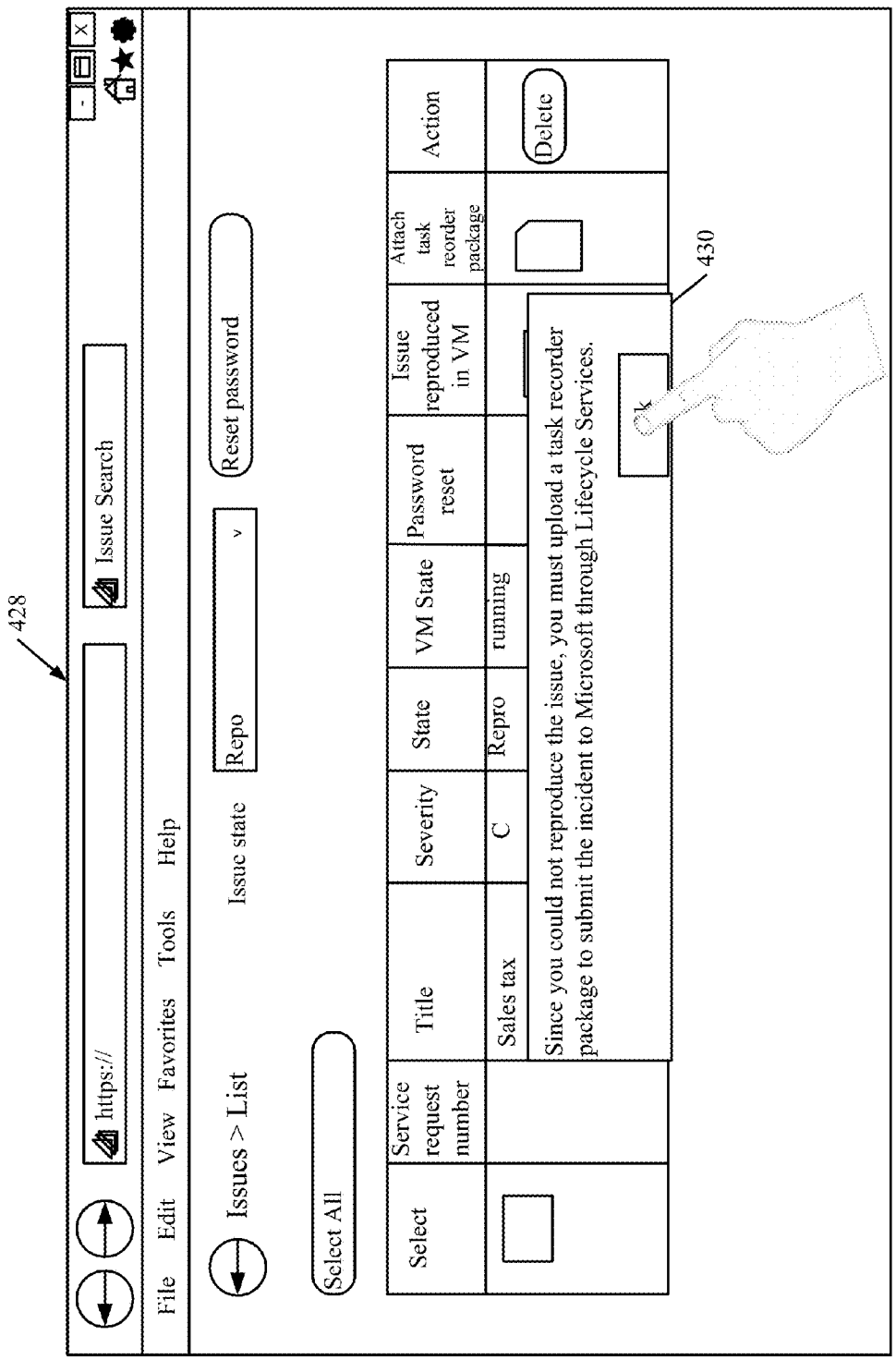
Figure 3T:
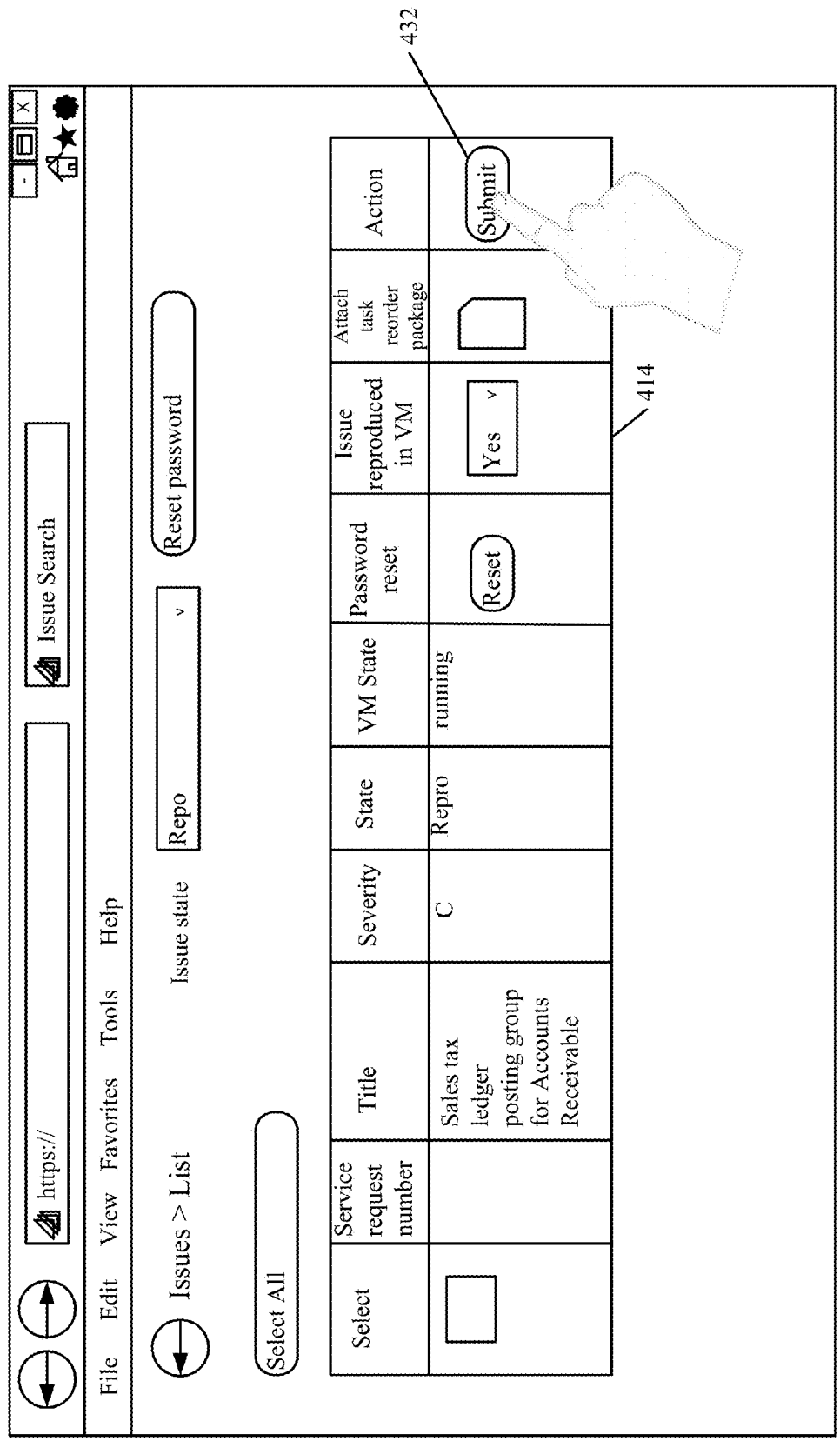
Figure 3U:
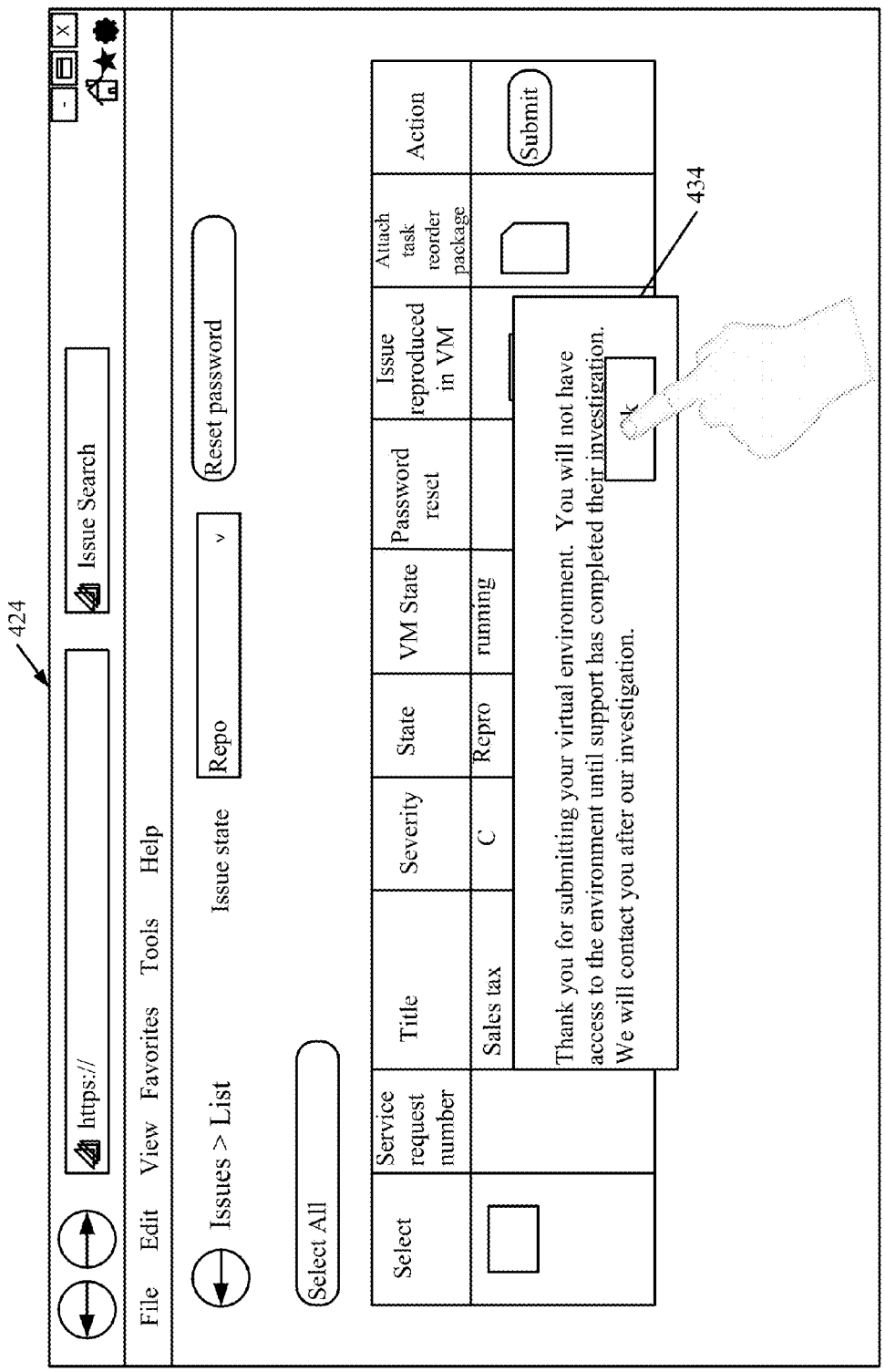
Figure 3V:
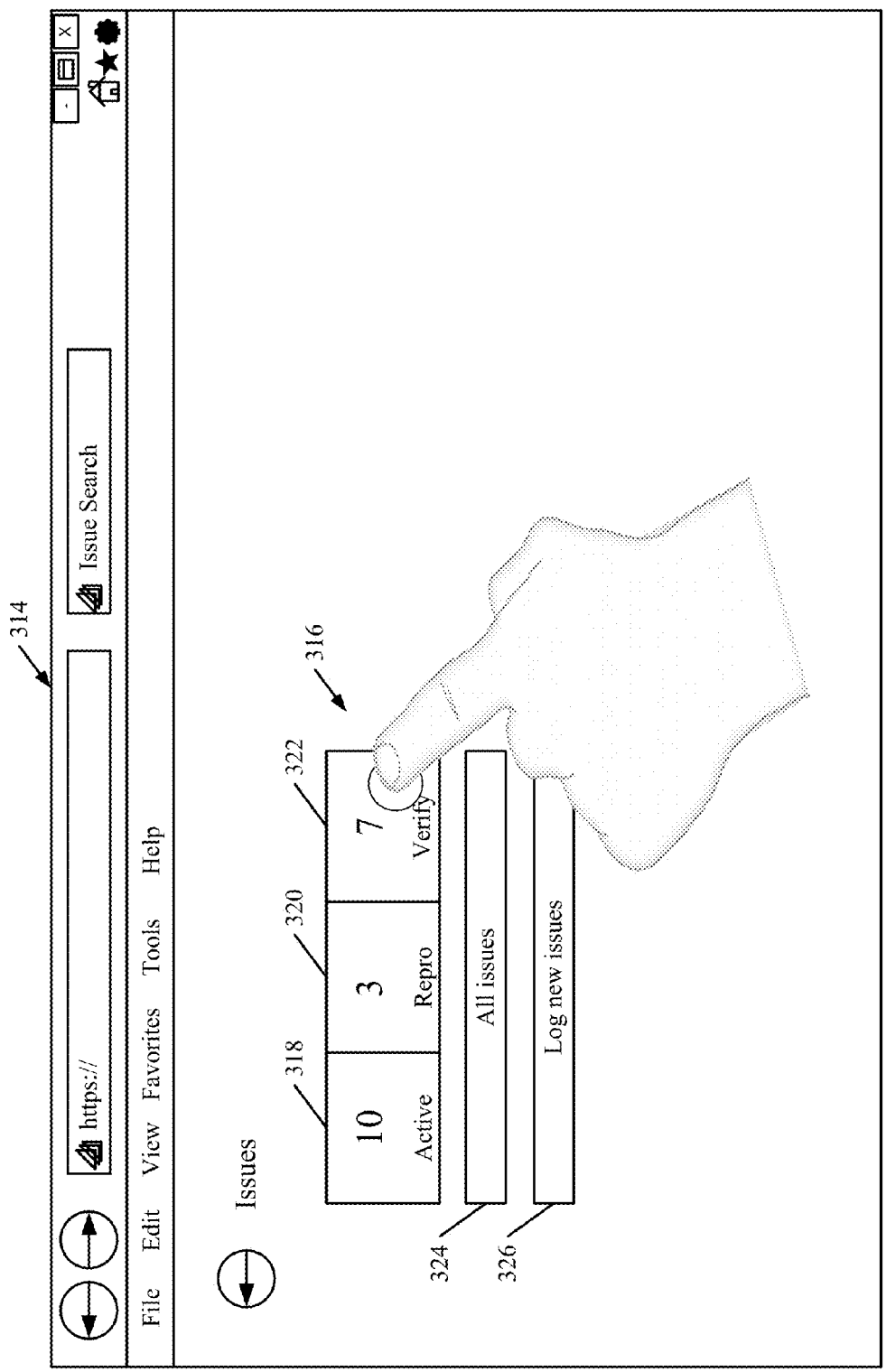
Figure 3W:
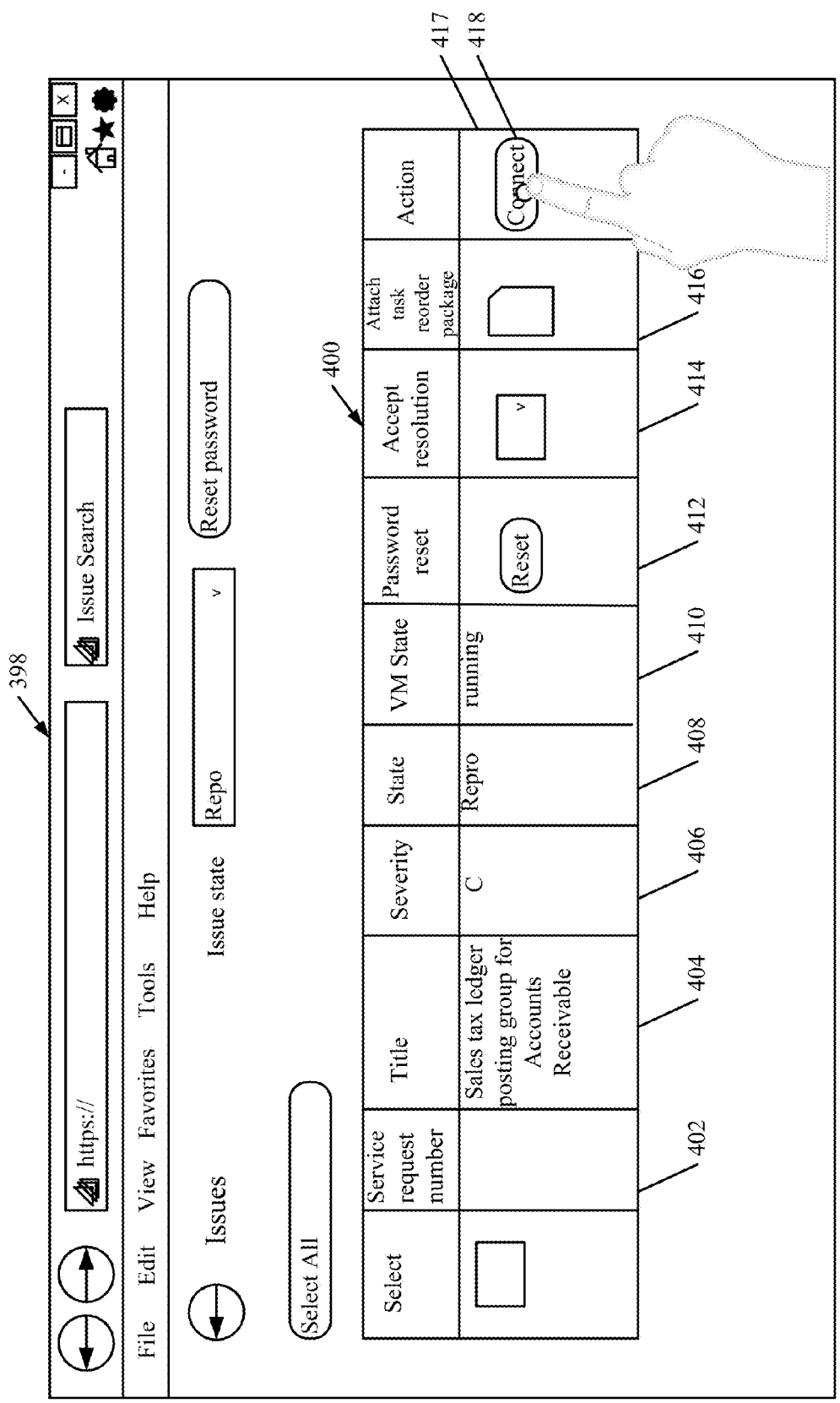
Figure 3X:
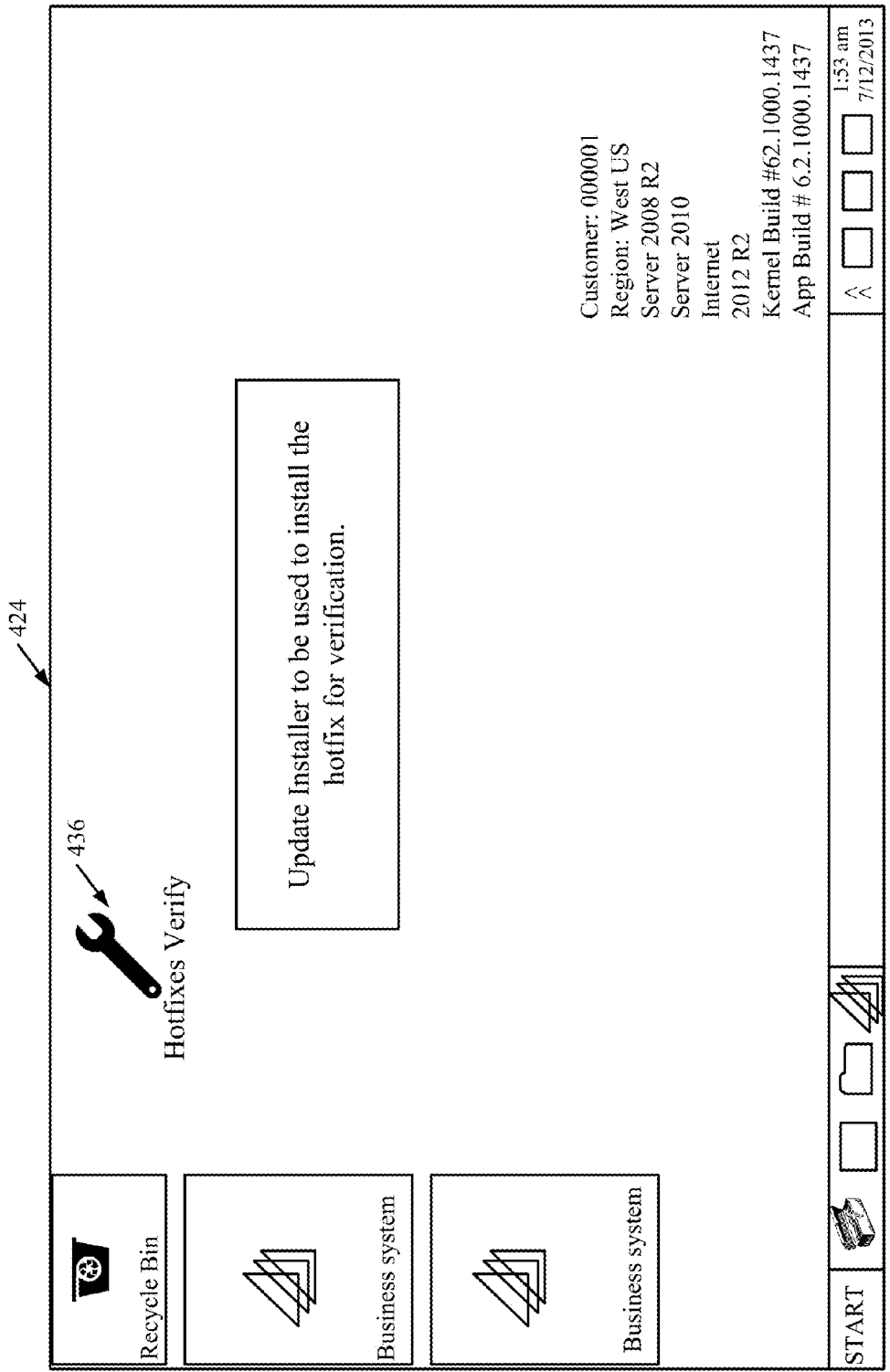
Figure 3Y:
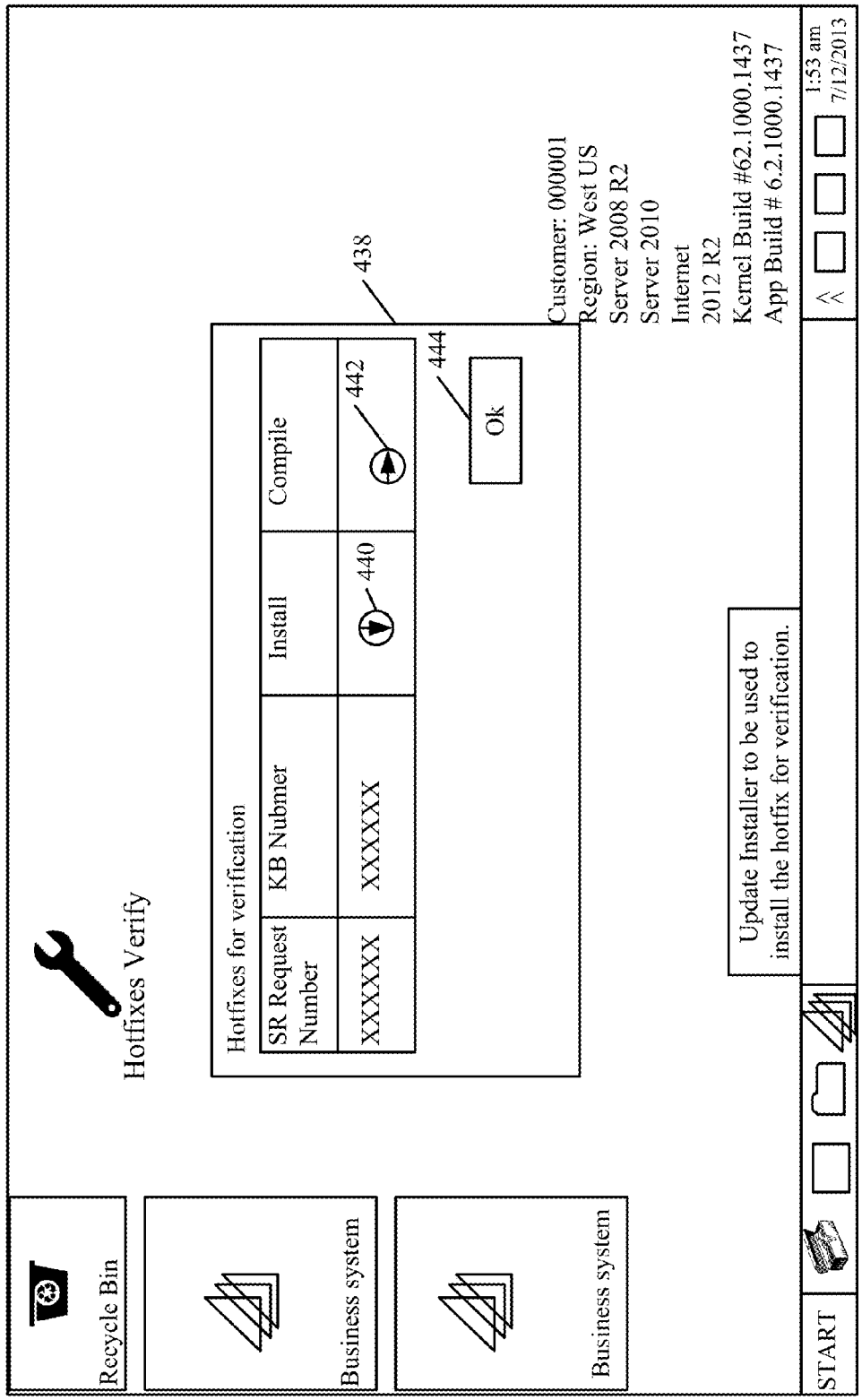
Figure 3Z:
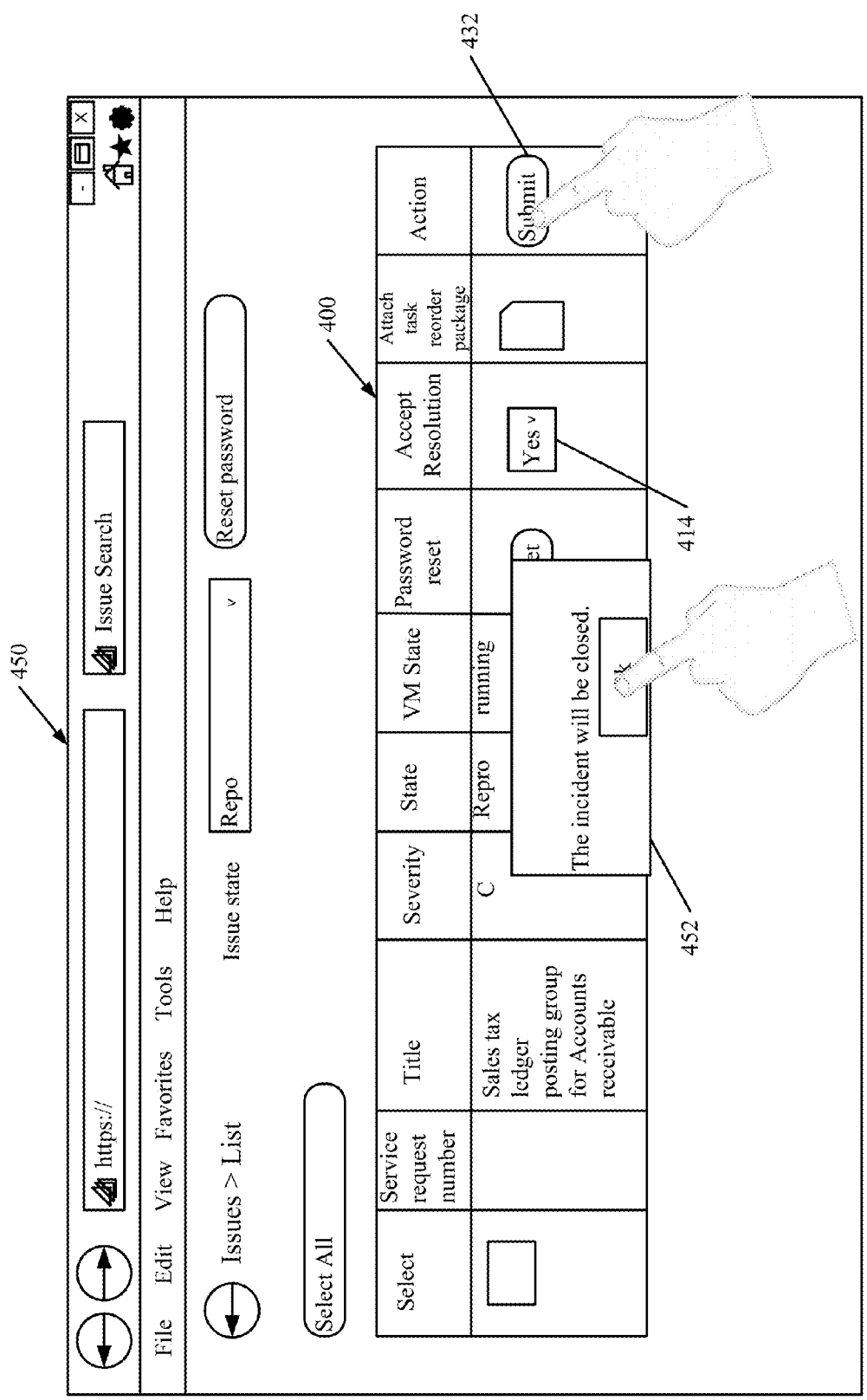
Figures 1, 3Z:
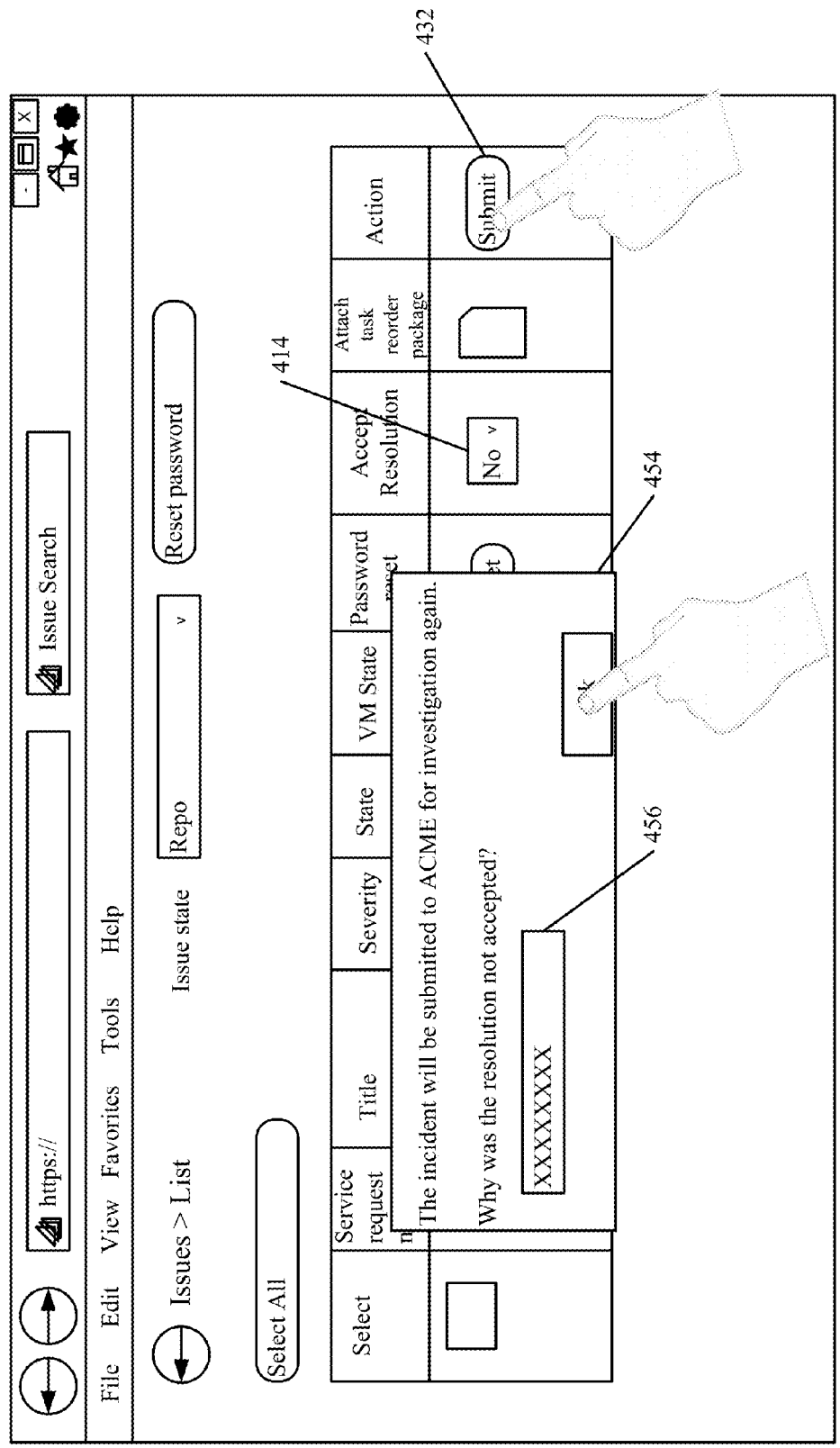

FIGS. 1A and 1B are collectively referred to herein as FIG. 1. FIG. 1 is a block diagram of one illustrative support architecture 100. Support architecture 100 shows user 102 interacting with user interface displays 104 generated by a user device 106. The user interface displays 104 include user input mechanisms that user 102 can interact with in order to control and manipulate, an enterprise system (such as a business system) 108.

FIG. 1 also shows that architecture 100 includes a life cycle system 110 that interacts with a virtual environment service 112 to generate virtual diagnostic environments in a virtual control system 114. Support engineers 116 and developers 118 can interact with the virtual diagnostic environments in system 114 to generate a fix 120 that can be applied to enterprise system 108 to fix a technical issue reported by user 102. Before describing the operation of architecture 100 in more detail, a brief description of some of the items in architecture 100 will be provided.

In the embodiment shown in FIG. 1, user device 106 can be a wide variety of different types of devices, such as a desktop computer, a laptop computer, a mobile device (such as a tablet or smart phone), among others. It illustratively includes processor 122 in data store 124, which will be described in greater detail below.

Enterprise system 108 can be a wide variety of different types of enterprise systems that are deployed for an organization. The present discussion will proceed with respect to enterprise system 108 being a business system (such as a CRM system, an ERP system, an LOB system, etc.). This description is provided for the sake of example only, and it could be other systems as well.

FIG. 1 shows that system 108 illustratively includes processor 126, data store 128, diagnostic data collection component 130 and other components 132. In one embodiment, data store 128 stores business data 134, version numbers 136 for the various items deployed in business system 108, a listing of the updates 138 that have been applied to business system 108, a list of fixes 140 that have been applied to business system 108, and it can store other information as well. In one embodiment, the business data 134 includes entities, workflows, and other information. Business applications (such as general ledger applications, inventory applications, billing applications, etc.) operate on the data and workflows in data store 128 to allow user 102 to perform tasks, activities, operations, or other things in order to conduct the business of the organization in which business system 108 is deployed.

Diagnostic data collection component 130, when requested, illustratively collects a variety of different types of diagnostic data that can be used to identify the configured environment of business system 108. The diagnostic information can illustratively be used to generate a virtual diagnostic environment as described below with respect to FIGS. 2A-2C.

Life cycle system 110 illustratively includes a plurality of different services 142-144 which can be used by various groups in order to identify, track and resolve issues that arise during various life cycle stages of a project (e.g., from presale to implementation and maintenance). For instance, as business system 108 is being designed, built, deployed and tested, the various services 142-144 illustratively allow the developers, as well as the user organization, to track issues which arise and to determine whether the customer's expectations are met when the final instance of business system 108 is deployed at the organization. User 102 can illustratively log into life cycle system 110 to view the various information provided by services 142-144. Diagnostic data collection component 130 can be deployed either within business system 108, or within life cycle system 110, or part of it can be deployed in both places. It is used in conjunction with services 142-144 to obtain diagnostic environmental information from the particular business system instance 108. Issue reporting component 143 lets a user report an issue the user is having with business system 108. Issue reproduction component 149 allows the user to reproduce the issue in a diagnostic environment, and issue verification component 151 allows the user to verify that the issue is fixed in the diagnostic environment. These are described in greater detail below as well.

Virtual environment service 112 illustratively includes virtual machine generator 146 and mapping component 148. Virtual machine generator 146 illustratively obtains the collected environmental data 141 (that can be collected by diagnostic data collection component 130) and generates a virtual machine in virtual machine control system 114 so that it reproduces the environment of business system 108. Virtual machine control system 114 includes one or more processors 154. The virtual machines are indicated by virtual business system instance 150 and virtual business system instance 152. Mapping component 148 illustratively generates user mappings, and other mappings, between the virtual instances 150-152 in system 114, and users 102 (as well as support engineers 116 and developers 118). The mappings can be used for accessing the virtual instances.

Before describing detailed operation of architecture 100, a brief overview of the operation will be provided to enhance understanding. User 102 first encounters a technical issue with business system 108 (system 108 is not functioning as desired). This can happen in a variety of ways such as when user 102 is using or deploying or otherwise interacting with business system 108. User 102 then logs into life cycle system 110 to report the issue. Issue reporting component 143 illustratively generates user interface displays 104 with user input mechanisms that user 102 can interact with in order to identify and describe the issue. System 110 then uses diagnostic data collection component 130 to collect environmental data that can be used to reproduce the environment in which business system 108 is deployed. System 110 provides the collected environment data 141 to virtual machine generator 146 which generates a virtual business system instance (e.g., instance 150) as a virtual diagnostic environment that reproduces the environment in which business system 108 is running (absent the actual data for system 108). Mapping component 148 maps user 102 (and other authorized users) to virtual business system instance 150, so they can access it later. Issue reporting component 143 then generates a notification to user 102 that the virtual business system instance 150 has been generated. User 102 then accesses the virtual business system 150 through component 149 and reproduces the technical issue which user 102 reported. Reporting component 155 can record the user's actions, in reproducing the technical issue. Support engineers 116 can then access the recorded or described issue which has been submitted by user 102, and further define the issue for developers 118. Developers 118 can then access the virtual business system instance 150 to generate a fix 120 that fixes the technical issue. System 110 then notifies user 102 that a fix has been generated. User 102 can then access virtual business system instance 150 (through component 151), again, with the fix applied, to verify that the technical issue has indeed been resolved. If so, user 102 illustratively downloads fix 120 and applies it to business system 108 to fix the technical issue.

Figure 2A:
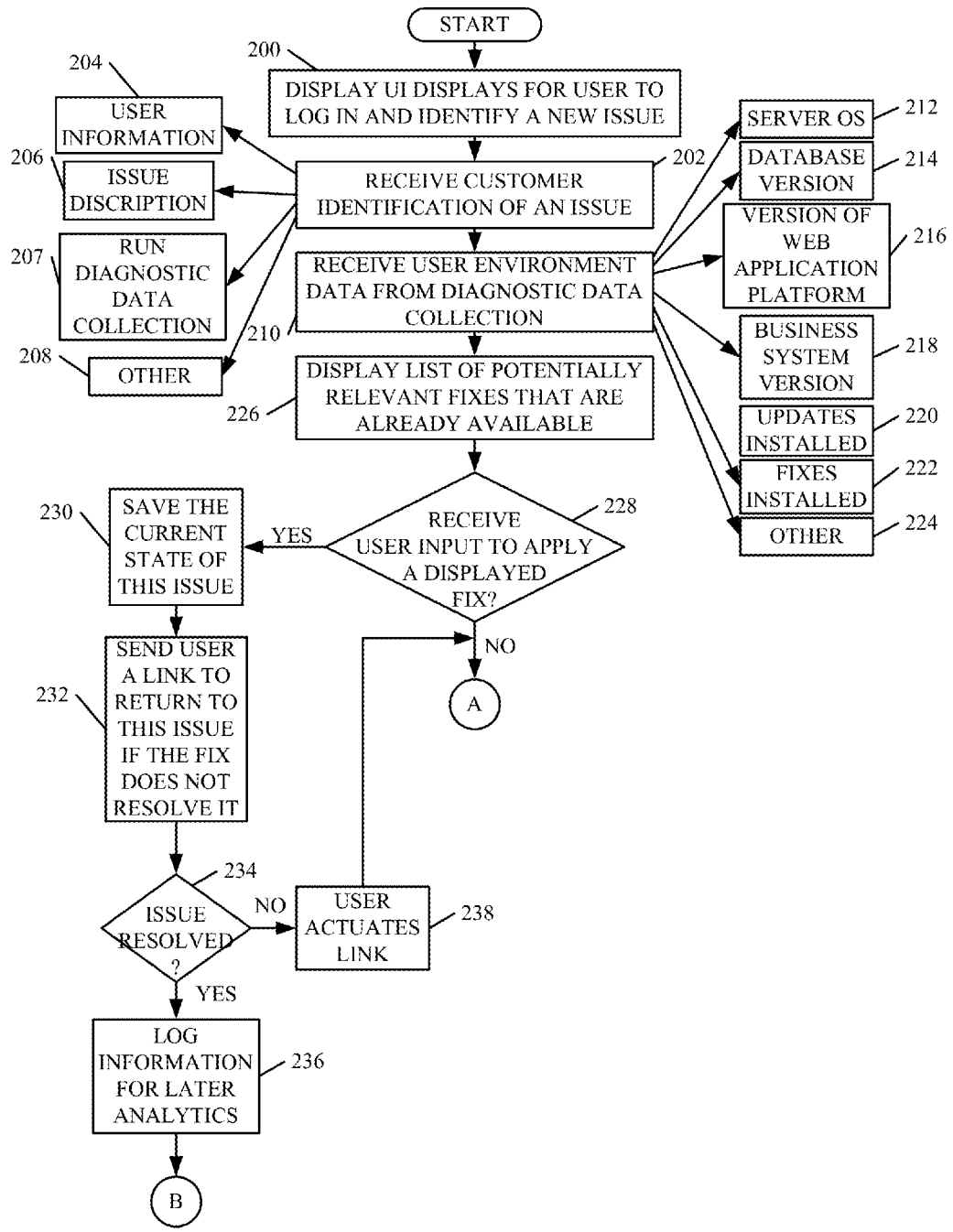
FIGS. 2A-2C (collectively FIG. 2) show a flow diagram illustrating one embodiment of the operation of the architecture shown in FIG. 1 in supporting a user.
Figure 2B:
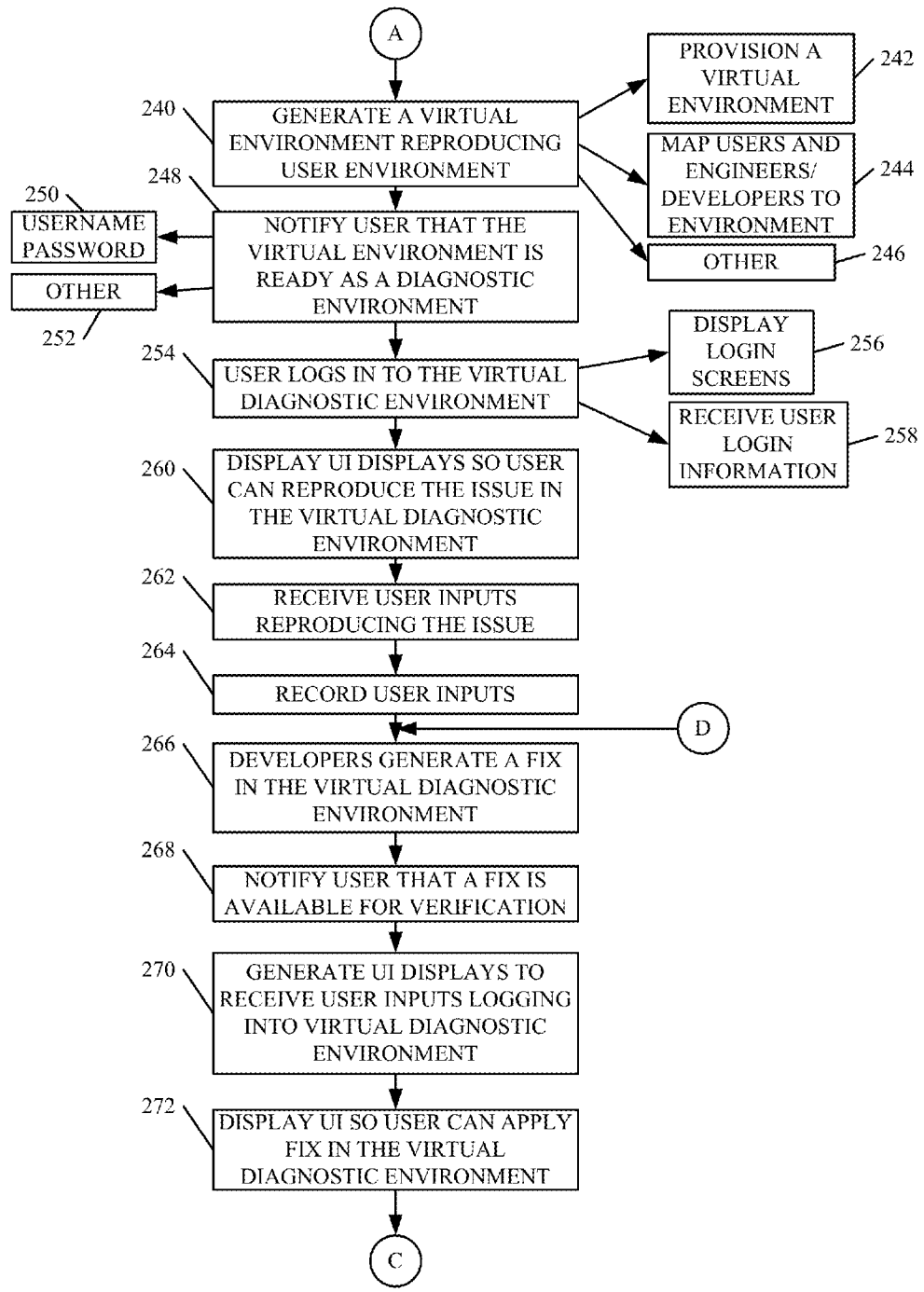
Figure 2C:
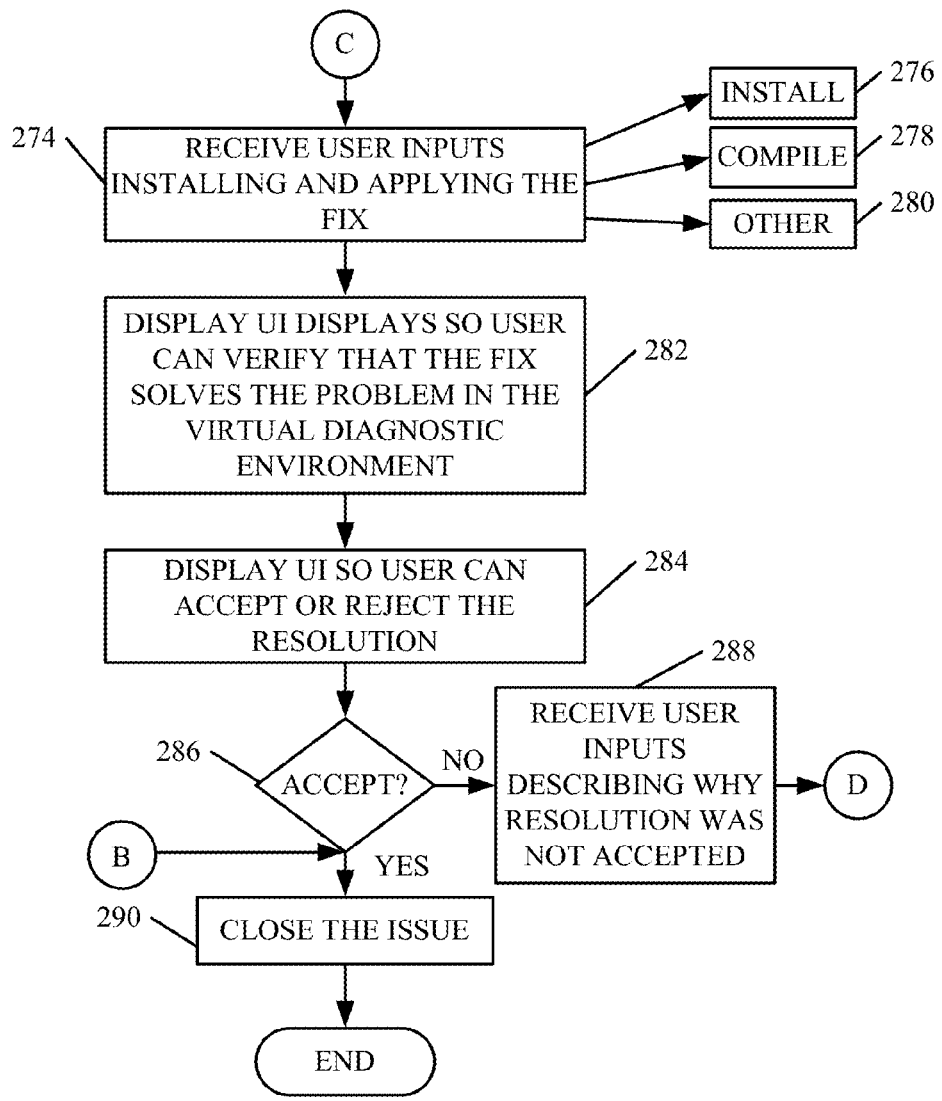

A more detailed discussion of the operation of architecture 100 will now be provided with respect to the flow diagram of FIGS. 2A-2C (collectively referred to as FIG. 2). FIGS. 3A-3Z-1 show exemplary user interface displays that can be generated by system 110. FIGS. 2-3Z-1 will now be described in conjunction with the block diagram of FIG. 1.

User interface component 145 first illustratively generates user interface displays so that user 102 can log into system 110 and identify a new problem or technical issue. This is indicated by block 200 in the flow diagram of FIG. 2. User interface component 145 then illustratively receives customer identification inputs that identify the issue. This is indicated by block 202. By way of example, the user inputs can include user information 204, and issue description 206, or other information 208. Also, as part of identifying the issue at block 202 of FIG. 2, system 110 can illustratively run diagnostic data collection using diagnostic data collection component 130, in order to obtain diagnostic data describing the environment in which business system 108 is deployed.

FIG. 3A shows one embodiment of a user interface display that can be displayed by system 110, and that allows user 102 to initiate the login process. For example, user 102 can actuate button 300 to begin the login. FIG. 3B shows one embodiment in which user 102 illustratively provides authentication information (such as a username and password), etc. By way of example, user 102 can provide alphanumeric inputs in text boxes 302 in order to do this. User 102 can then actuate the sign-in user input mechanism 304 to sign in to system 110.

User interface component 145 then illustratively generates a user interface display, such as display 306 shown in FIG. 3C. Display 306 illustratively includes a variety of user input mechanisms, including a projects user input mechanism 308. When the user actuates projects user input mechanism 308, the user is illustratively navigated to a projects display, such as display 310 shown in FIG. 3D. Projects display 310 can illustratively include a variety of additional user input mechanisms, that can be actuated by the user, in order to navigate to more detailed information about a variety of different things.

In one embodiment, the user input mechanisms illustratively include user input mechanism 312 that corresponds to "support issues". When the user actuates user input mechanism 312, user interface component 145 illustratively navigates the user to a user interface display, such as user interface display 314 shown in FIG. 3E. User interface display 314 illustratively includes a set of user input mechanisms 316 that correspond to issues that are currently being addressed for business system 108. In one embodiment, user input mechanisms 316 include active issues user input mechanism 318. When the user actuates mechanism 318, the user is illustratively navigated to more detailed information about active issues. User input mechanisms 316 also illustratively include a reproduction user input mechanism 320. When the user actuates mechanism 320, the user is illustratively navigated to more detailed information about issues that are currently being reproduced (or which need to be reproduced) so that they can be submitted for developers to investigate and fix them.

User input mechanisms 316 also illustratively include a verify user input mechanism 322. When the user actuates user input mechanism 322, the user is illustratively navigated to a set of user interface displays that allow the user to verify that fixes have actually remedied or resolved the particular issue that was reported.

User input mechanism 316 also illustratively includes an all issues user input mechanism 324 and a log new issue user input mechanism 326. When the user actuates mechanism 324, the user is illustratively navigated to a display that shows more detailed information about all issues that are currently submitted. When the user actuates mechanism 326, the user is illustratively navigated to a set of user interface displays that allow the user to log a new issue with business system 108 so that it can be investigated and fixed.

FIG. 3F shows one embodiment of a user interface display 328 that allows the user to begin describing the new issue. User interface display 328 illustratively includes a stage indicator 330 that shows the user the stage in which the present issue currently resides. Stage indicator 330 illustratively includes a new indicator 332 that shows that the present issue is a newly reported issue. Repro indicator 334 illustratively indicates that the issue is being reproduced (or needs to be reproduced) by the user so that it can be investigated and fixed. Active indicator 336 indicates that the present issue is active (and is being worked on by support personnel). Verify indicator 338 indicates that the fix has been generated for this issue, and the user can illustratively verify that it works, in the virtual diagnostic environment created for this issue. Closed indicator 340 indicates that the issue has been closed.

User interface display 328 also illustratively includes an environment user input mechanism 342 that allows the user to identify a particular environment in which business system 108 is deployed. In the embodiment shown in FIG. 3F, mechanism 342 is a drop down menu that allows the user to select a production user input mechanism 344 to indicate that system 108 is in production. The user can also actuate a UAT user input mechanism 346 to indicate that system 108 is deployed in a user acceptance testing environment, and testing user input mechanism 348 indicates that business system 108 is still deployed in a testing environment. Of course, other mechanisms can be used as well.

FIG. 3G shows another embodiment of a user interface display 350. User interface display 350 can be generated in response to the user selecting the specific environment using user input mechanism 342.

FIG. 3G shows that diagnostic data collection component 130 has been run, and has collected a set of diagnostic data shown generally at 352 in FIG. 3G. The collected data (141 in FIG. 1) can include a wide variety of different kinds of information that can be used to reproduce a diagnostic environment which is the same as the environment of business system 108. That information can include, for example, the server operating system used in business system 108, the database version used in system 108, the version of the application platform used to perform content and document management, a major version of business system 108, an identification of the updates 138 that have been applied to business system 108, any fixes that have already been applied to system 108, among other things. Receiving user environmental data 141 from diagnostic data collection component 130 is indicated by block 210 in the flow diagram of FIG. 2. The server operating system is indicated by block 212, the database version is indicated by block 214, the version of the application platform is indicated by block 216, the business system version is indicated by block 218, the updates installed are indicated by block 220, the fixes installed are indicated by block 222, and other information is indicated by block 224. Some of the diagnostic information is shown generally at 352 in FIG. 3G.

User interface display 350 also illustratively includes a models installed user input mechanism 354. When the user actuates user input mechanism 354, the user is illustratively navigated to another user interface display that shows the various models that are installed on business system 108.

For example, FIG. 3H shows one embodiment of a user interface display 356 that can be generated to show this. FIG. 3H includes a popup display 358 that lists the various models that are installed on business system 108. In one embodiment, the models are listed by identification number, the layer where they reside, the model name, the model publisher, the version number and whether the model has been signed, as well as a description of the model. Once the user has viewed the installed models, the user can close popup display 358, and actuate a next user input mechanism 360 on the user interface display of FIG. 3G.

This illustratively navigates the user to another issue description user interface display, such as user interface display 362 in FIG. 3J. User interface display 362 displays a set of user input mechanisms 364 that allow the user to identify himself or herself, and pertinent information (such as the user's time zone, telephone number, e-mail address, primary and secondary support languages, the region of the country where the user resides, etc.).

After the user has entered this information, the user illustratively actuates a next user input mechanism 366 that navigates the user to a user interface display that allows the user to describe the problem in more detail. FIG. 3J shows one embodiment of a user interface display 368 that can be generated in order to do this. User interface display 368 illustratively includes a user input mechanism 360 that allows the user to give the issue a title, and a set of user input mechanisms 372 that allow the user to identify a topic and subtopic for the issue. A severity level input mechanism 374 allows the user to identify a severity level associated with this level. The user is also illustratively provided with an issue description input mechanism 376 that allows the user to describe the problem using text. Further, user input mechanism 378 allows the user to describe the actual result versus the expected result when the user performs a given action within business system 108, and which identifies the issue. User input mechanism 380 allows the user to identify the symptoms that led to the submission of the present issue.

In one embodiment, if the user identifies a severity level using mechanism 374 that is high enough, the user is provided with additional user input mechanisms shown generally at 382 that can be used to further define the severity level of the issue, such as whether the issue is causing a critical work stoppage, whether the user has personnel available to work on the issue during non-business hours, and allowing the user to confirm the criticality level assigned to the issue.

Once the user has defined the issue, the user can illustratively actuate next user input mechanism 384. This illustratively navigates the user to a user interface display, such as display 386 shown in FIG. 3K. Once the user has defined the issue, system 110 can illustratively display, in user interface display 386, a number of potential fixes that have already been generated, and may be applicable to the issue described by the user. By way of example, one of the services in system 110 may be a hot fix service that tracks the various hot fixes that have been generated for business system 108. Issue reporting component 143 can generate a query, based upon the issue reported by the user, to identify any fixes that may potentially fix the problem, if installed on business system 108. The user can illustratively download any of the fixes in display 386 by actuating a corresponding user input mechanism (shown generally at 388). Displaying the list of potentially relevant fixes that are already available is indicated by block 226 in FIG. 2. Receiving a user input to apply a displayed fix is indicated by block 228.

If the user does apply a fix, then the state of the current issue is saved so that the user can return to it, if the fix does not successfully address the issue. Saving the current state of the issue is indicated by block 230 in FIG. 2. In one embodiment, the issue is saved by logging the title, version number, customer, project, the identifying number of the fix that was downloaded, and the models installed on business system 108. Issue reporting component 143 then sends the user a link to return to this particular issue, at this particular spot in the issue reporting flow, if the fix does not resolve it. This is indicated by block 232 in FIG. 2. The user can also illustratively actuate a link to indicate that the fix did indeed resolve the issue. If this happens, this information is logged so that it can be used to improve future analytics corresponding to reported issues of this type. Determining whether the issue is resolved and logging that information is indicated by blocks 234 and 236 in FIG. 2.

If the user has applied one of the fixes, but the fix did not resolve the problem, then the user can illustratively actuate the link sent by issue reporting component 143 to return to the issue reporting flow. Having the user actuate the link is indicated by block 238 in FIG. 2. In that case, processing reverts to block 240. The same is true if, at block 228, the user did not elect to apply any of the fixes that were displayed in user interface display 386 of FIG. 3K.

In either case, the user illustratively actuates a next indicator 390 in the user interface display of FIG. 3K, and system 110 provides the collected environmental data 141 to virtual environment service 112, where it is used to generate a virtual diagnostic environment (such as virtual business system instance 150). In generating the virtual business system instance 150, virtual environment service 112 first uses virtual machine generator 146 to provision a virtual environment (to generate a virtual machine) in virtual machine control system 114. This is indicated by block 242 in FIG. 2. Mapping component 148 then generates mappings 156 that map the users and various engineers 116 and developers 118 to the virtual environment (e.g., the virtual business system instance 150) that has just been generated, so they have access to it. This is indicated by block 244. Other steps 264 can be taken in order to generate the virtual environment as well.

FIG. 3L shows one illustrative embodiment of a user interface display 392 that can be used to convey this information to user 102. It indicates that the virtual environment is being provisioned within the virtual machine control system 114 and that the user will be sent a message with a username and password (or other authentication information) when the environment is ready to be accessed by the user.

FIG. 3M shows one illustrative user interface display 394 that can be generated by virtual machine control system 114. It illustratively shows that the particular geographic region where the user resides (who reported the issue) is passed to system 114 so that the virtual environment is created in a data center that is close to that geographic region. This allows the support personnel and the user to be in the same, or close to the same, time zone. The virtual environment is created using the collected environmental data 141 that was collected by diagnostic data collection component 130. The various hot fixes that had been applied to business system 108 are applied in the diagnostic environment as well. In one embodiment, one virtual environment (such as one virtual business system instance 150) is created for each issue that is submitted. Notifying the user that the virtual environment has been created as a diagnostic environment for that user is indicated by block 248 in FIG. 2. Sending the username and password is indicated by block 250, and sending other information is indicated by block 252.

At that point, the user can again log in to life cycle system 110 through suitable user interface displays generated by user interface component 145. The user can navigate to the user interface display such as user interface display 396 shown in FIG. 3N. User interface display 396 is similar to user interface display 314 shown in FIG. 3E, and similar items are similarly numbered. However, it can be seen that in FIG. 3N the user is actuating the "repro" user input mechanism 320. This illustratively navigates the user to a user interface display that includes more information about various issues that need to be reproduced by the user so they can be investigated and fixed.

By way of example, FIG. 3O shows a user interface display 398 that can be generated in order for the user to do this. Display 398 includes an issue that has a virtual environment provisioned for it, so that the user can reproduce the issue on the virtual environment. Display 398 includes table 400 that identifies the issue. It illustratively includes a service request number field 402, title field 404 that lists the title of the issue, severity field 406 that identifies the severity level, state field 408 that lists the particular state in which the issue currently resides, a virtual machine state field 410 that shows the state of the virtual machine (or virtual environment) that has been provisioned for this issue, a password reset field 412 that allows the user to reset his or her password, a reproduction field 414 that identifies whether the issue has been successfully reproduced in the virtual environment, a task recorder package indicator 417 that indicates whether the recorded reproduction of the issue in the virtual environment has been attached, and an action field 416 that includes a user actuable input mechanism 418 that allows the user to take an action. In the embodiment shown in FIG. 3O, user input mechanism 418 allows the user to connect to the virtual environment in order to reproduce the issue.

When the user actuates mechanism 418, the user is illustratively asked to enter the connection information that allows the user to connect to the virtual machine and to access the virtual diagnostic environment. FIGS. 3P and 3Q show various embodiments for this. In FIG. 3P, a popup display 420 allows the user to identify a computer along with a username, and FIG. 3Q shows that a popup display 422 allows the user to enter customer credentials. Having the user log in to the virtual diagnostic environment is indicated by block 254 in the flow diagram of FIG. 2. Displaying the login screens and receiving user login information is indicated by blocks 256 and 258 in FIG. 2.

The virtual business system instance 150 being accessed by the user then generates user interface displays that mimic those which would be encountered by the user accessing business system 108. FIG. 3R shows one embodiment of a user interface display screen 424 that illustrates this. It can be seen that the user has logged into a virtual machine and the virtual environment identifying data is indicated generally at 426. This allows the user to verify that he or she has indeed logged into the proper diagnostic environment. The user can then navigate through the diagnostic environment and the virtual business system instance 150 generates user interface displays as if the user were using business system 108. This allows the user to reproduce the issue in the diagnostic environment (on virtual business system instance 150) just as if the user were encountering the issue on business system 108. Displaying the user interface displays so the user can reproduce the issue in the virtual diagnostic environment is indicated by block 260 in the flow diagram of FIG. 2. Receiving the user inputs actually reproducing the issue is indicated by block 262.

As the user is reproducing the issue, recording component 155 illustratively records all customer interaction with the user interface display so that a support engineer 116 or developer 118 can replay those actions to actually see how the user encountered the issue. Recording the user inputs is indicated by block 264 in FIG. 2.

It may be that, for some reason, the user is not able to reproduce the issue on the virtual business system instance 150. If that is the case, the user can return to the issue list shown in FIG. 3O. By setting the issue reproduction user input mechanism 414 to "no" the system 110 indicates that if the user could not reproduce the issue in the virtual environment (using virtual business system instance 150), then the user is asked to upload the recording of the task, so that it can be submitted for review. FIG. 3S shows one embodiment of such a user interface display 428. Popup display 430 instructs the user to attach a task recorded package to the issue so that it can be submitted. However, if the issue was reproduced in the virtual business system instance 150, then the user illustratively sets user input mechanism 414 to "yes" and actuates submit actuator 432 (as shown in FIG. 3T) to submit the issue for investigation and fixing by support engineers 116 and developers 118, respectively. In one embodiment, once the issue has been submitted, user interface component 145 in system 110 again generates a message (such as at 436 in the user interface display 434 of FIG. 3U).

Once the issue has been submitted, support engineers 116 illustratively investigate the issue and can further define it for developers 118. Developers 118 illustratively work on the issue, and eventually generate a fix in the virtual business system instance 150, for the issue. This is indicated by block 266 in FIG. 2. System 110 then illustratively notifies user 102 that a fix is available for verification. This is indicated by block 268 in FIG. 2. User interface component 145 in system 110 then generates the user interface displays that receive user inputs so the user can log in to the virtual diagnostic environment (virtual business system instance 150). This is indicated by block 270 in FIG. 2.

FIG. 3V shows a user interface display that indicates that the user can again navigate to the user interface display 314 shown above with respect to FIG. 3E. However, FIG. 3V shows that the user is actuating the verify user input mechanism 322. In response, the user is illustratively navigated to the issue list 400 shown above in FIG. 3O. Similar items to those shown in FIG. 3O are similarly numbered in the user interface display 398 in FIG. 3W. It can be seen, however, that the state of the issue has now been advanced from "repro" (where it needed to be reproduced by the user) to "verify" where it now is to be verified by the user.

Thus, the user illustratively actuates the connect user input mechanism 418 in order to connect to the virtual diagnostic environment (the virtual business system instance 150). The user can again illustratively be asked for login information and credentials in order to access that environment. The virtual business system instance 150 then displays the user interface displays that allow the user to apply the fix in the virtual diagnostic environment (e.g., to virtual business system instance 150). This is indicated by block 272 in FIG. 2. The user interface displays in FIGS. 3X and 3Y illustrate one example of this.

The user interface display in FIG. 3X is similar to user interface display 424 in FIG. 3R and is similarly numbered. However, the user interface display in FIG. 3X includes a fix verify icon 436 that can be actuated by the user in order to initiate installing the fix in the diagnostic environment. FIG. 3Y shows that a popup display 438 can be generated that allows the user install the fix, compile the code, and apply the fix to verify whether the fix actually fixes the problem. The user can do this by actuating the install user input mechanism 440 then the compile user input mechanism 442 and the apply (or OK) user input mechanism 444. Receiving the user inputs requesting that the fix be installed and applied is indicated by block 274 in FIG. 2. Installing the fix is indicated by block 276, compiling the code with the fix installed is indicated by block 278, and receiving any other user inputs is indicated by block 280.

Once this occurs, virtual business system instance 150 displays the user interface displays that allow the user to again recreate the scenario where the issue was encountered in business system 108. The user can then verify whether the applied fix has resolved the issue. Displaying the user interface displays so the user can verify that the fix solves the problem in the virtual diagnostic environment is indicated by block 282 in FIG. 2.

User interface component 145 then generates user interface displays that allow the user to either accept or reject the resolution of the issue. This is indicated by block 284 in FIG. 2. FIG. 3Z shows one embodiment of a user interface display 450 for doing this. User interface display 450 includes a table 400 which is the same as that shown with respect to FIG. 3W, except that the user input mechanism 414 has been actuated to indicate that the user accepts the resolution. When the user actuates mechanism 432, a popup display 452 is illustratively displayed indicating to the user that the incident will be closed. If the user actuates mechanism 414 to indicate that the user does not accept the resolution, the user can then actuate the submit actuator 432 and a popup display 454 (in FIG. 3Z-1) is illustratively generated that allows the user to indicate why the resolution was not accepted in text box 456. In that case, the issue will be resubmitted to the support engineers 116 and developers 118 so that it can be worked on again.

Receiving the user inputs indicating that the user accepts or rejects the resolution is indicated by block 286 in FIG. 2. If the user does not accept the resolution, receiving user inputs describing why resolution was not accepted is indicated by block 288. In that case, processing reverts to block 266. However, if, at block 286 it is determined that the user has accepted the resolution, then the issue is closed. This is indicated by block 290 in FIG. 2.

It can thus be seen that system 110, service 112 and system 114 provide an end-to-end experience for a customer who is submitting a technical support request for an enterprise system 108. The interactions between user 102 and the support personnel, in order to define the issue encountered by the user, are significantly reduced. The user's production environment is automatically detected and a replicated diagnostic environment is generated, so that it dynamically behaves as a replica of the user's production environment. This enables support personnel to focus on resolving the user-reported issue and drastically reduces the challenges faced in reproducing the reported issue, itself. The virtual diagnostic environment that is created provides a single view of the user's replicated environment, including all configuration settings, and installed model files. It can record the business process and problem description in the replicated environment. It also provides the ability for the customer to ensure that the problem can be reproduced on the virtual diagnostic environment and it also enables the user to verify that any fix has indeed resolved the issue.

The present discussion has mentioned processors, controllers, and servers. In one embodiment, the processors, controllers and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used withh the functionality distributed among more components.

Figure 4:
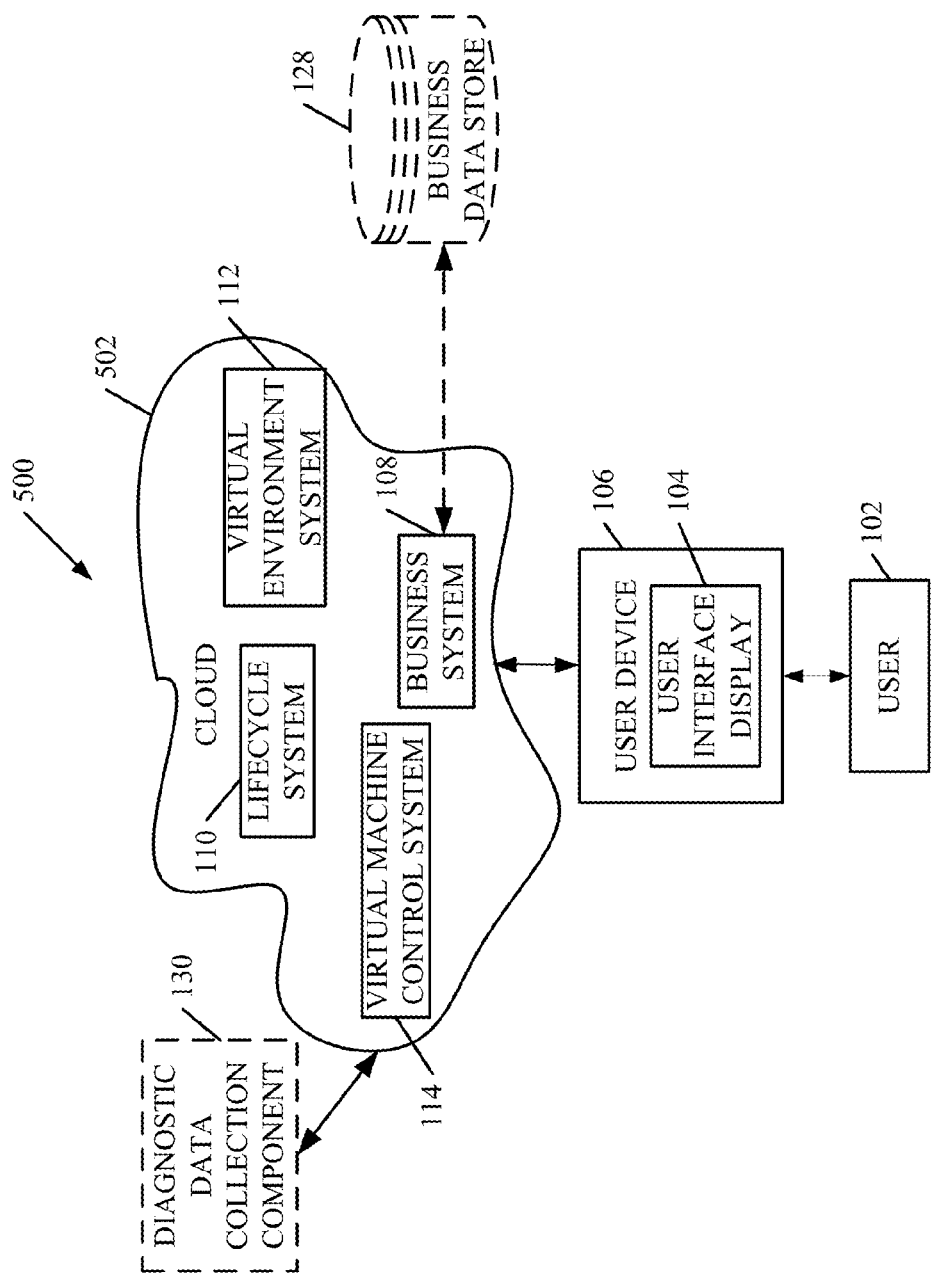
FIG. 4 is a block diagram of one embodiment of the architecture shown in FIG. 1 deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that systems 108, 110, 112 and 114 are located in cloud 502 (which can be public, private, or a combination where portions are public while others are private). Therefore, user 102 uses a user device 106 to access those systems through cloud 502.

FIG. 4 also depicts another embodiment of a cloud architecture. FIG. 4 shows that it is also contemplated that some elements of architecture 100 are disposed in cloud 502 while others are not. By way of example, data store 128 can be disposed outside of cloud 502, and accessed through cloud 502. In another embodiment, systems and components (e.g., component 130) can also be outside of cloud 502. Regardless of where they are located, they can be accessed directly by device 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
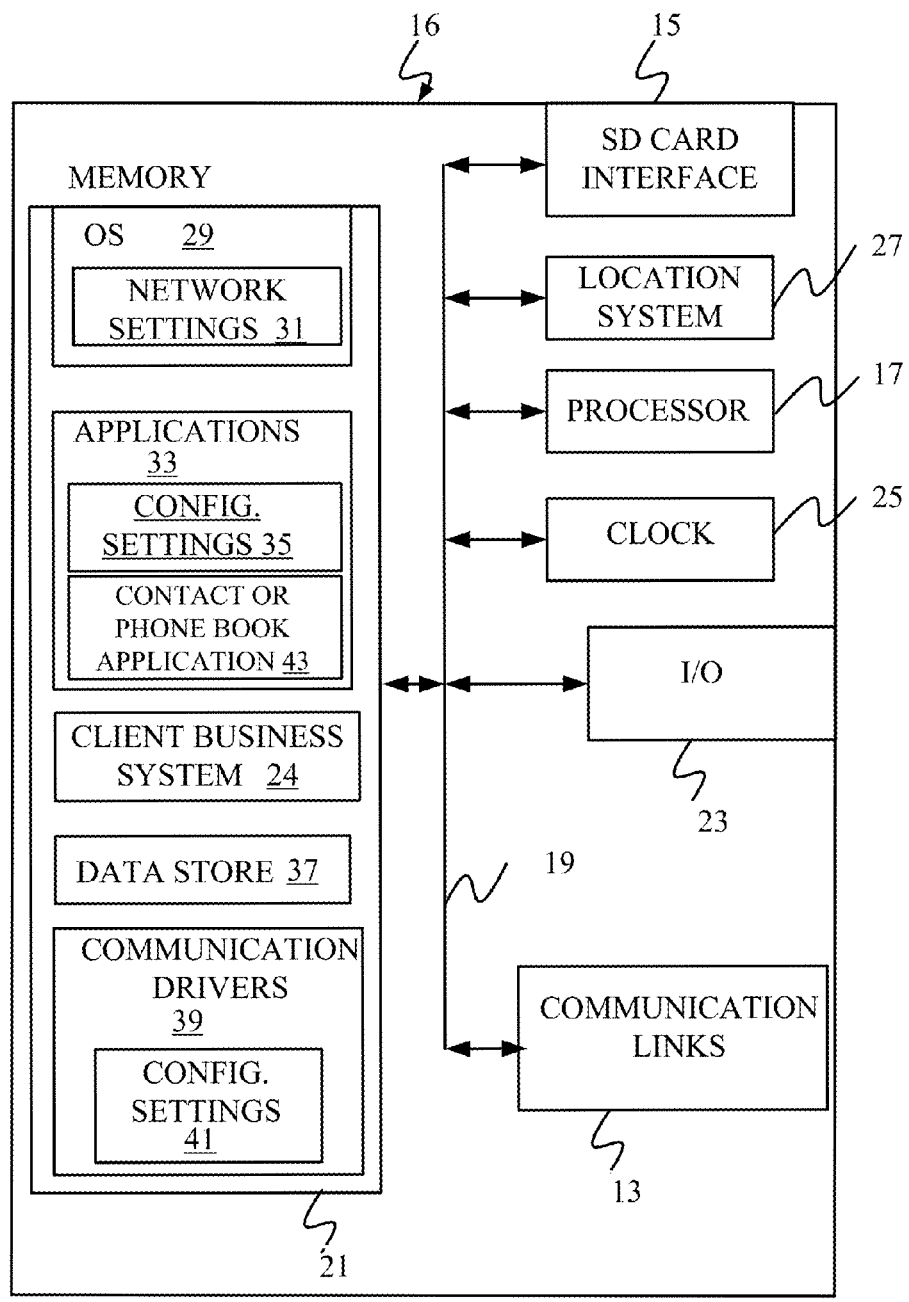
FIGS. 5-10 show various embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-10 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 126, 147, 154 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
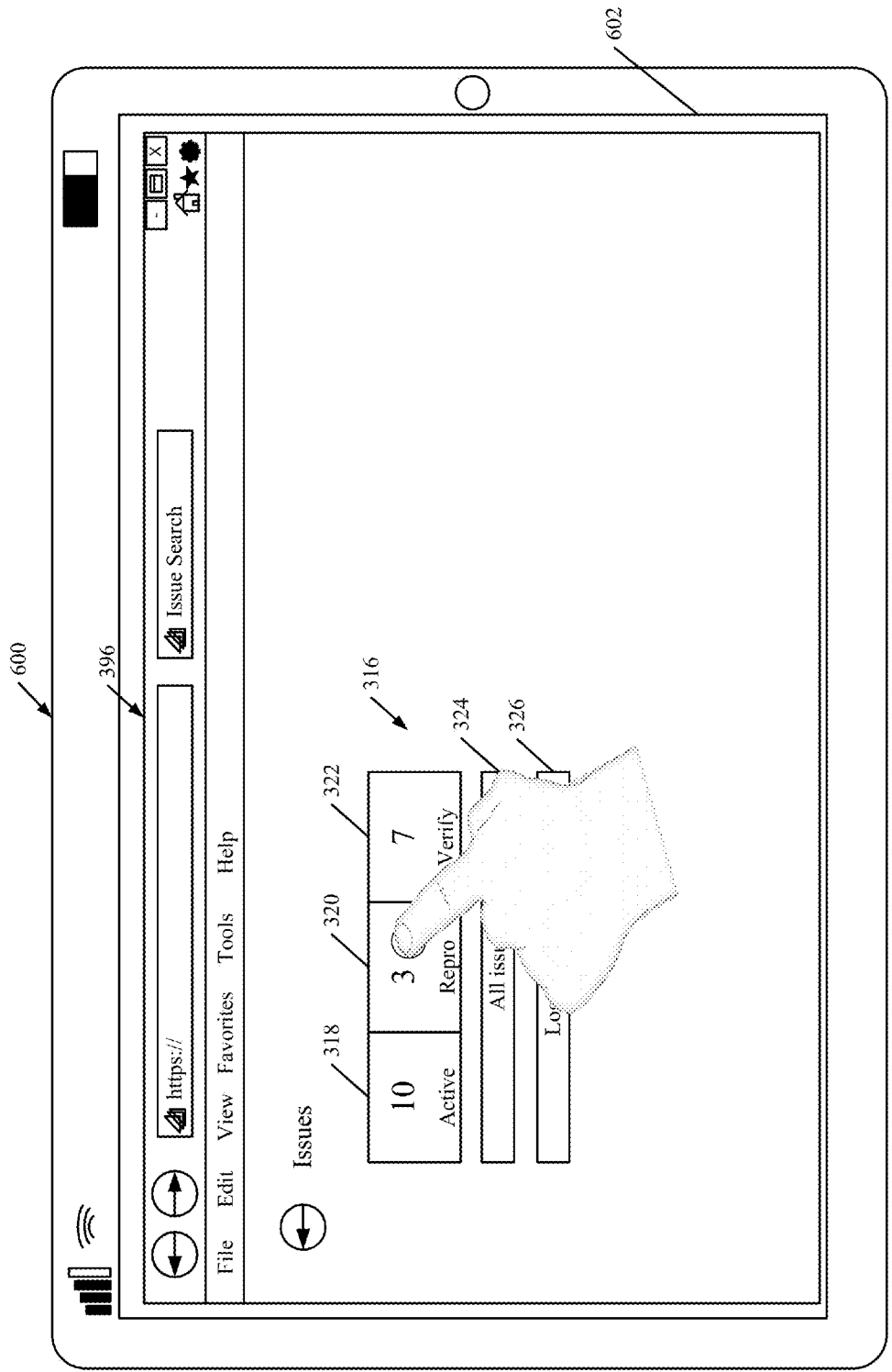

FIG. 6 shows one embodiment in which device 16 is a tablet computer 600. In FIG. 6, computer 600 is shown with user interface display from FIG. 3N displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
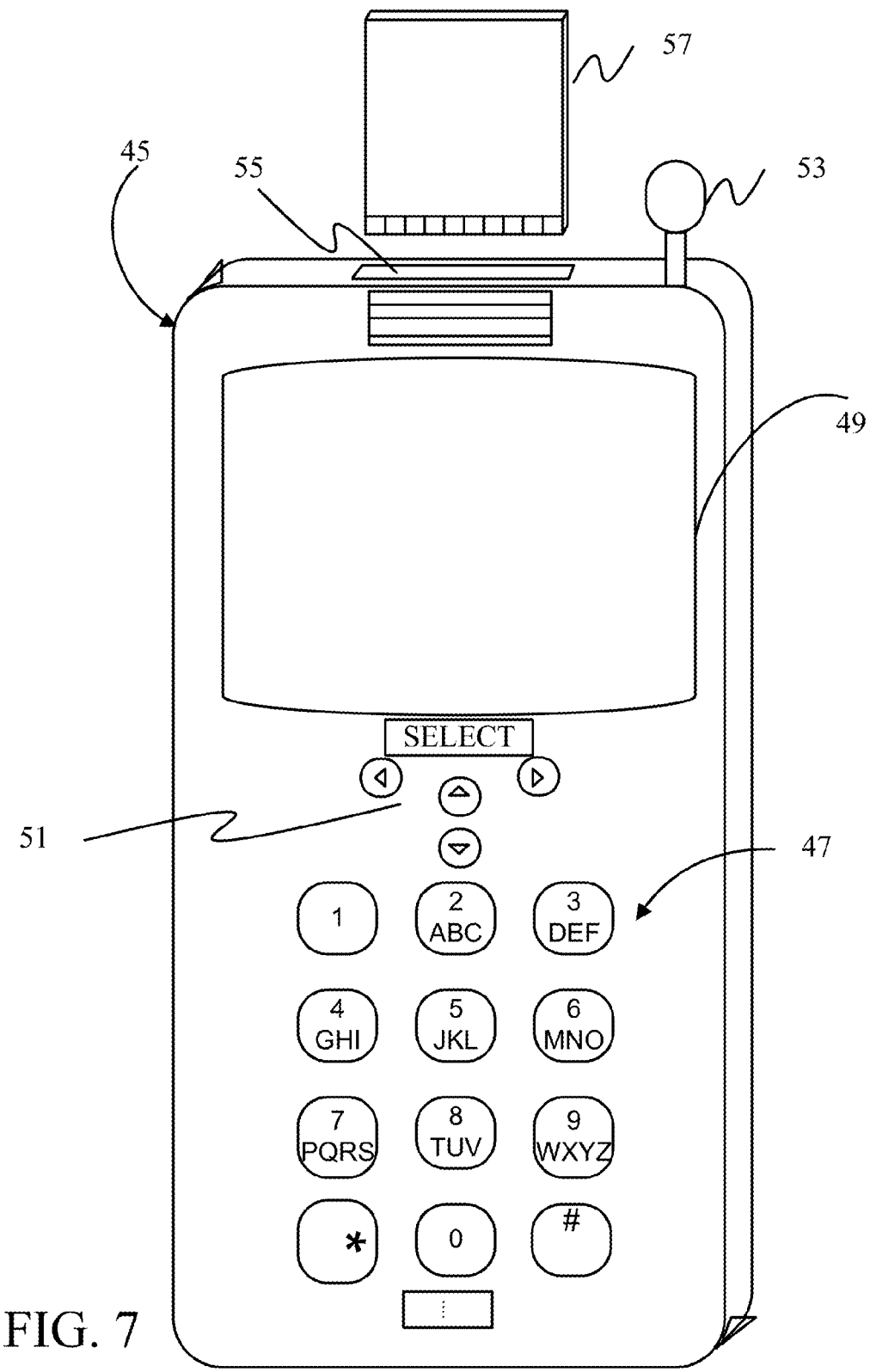
Figure 8:
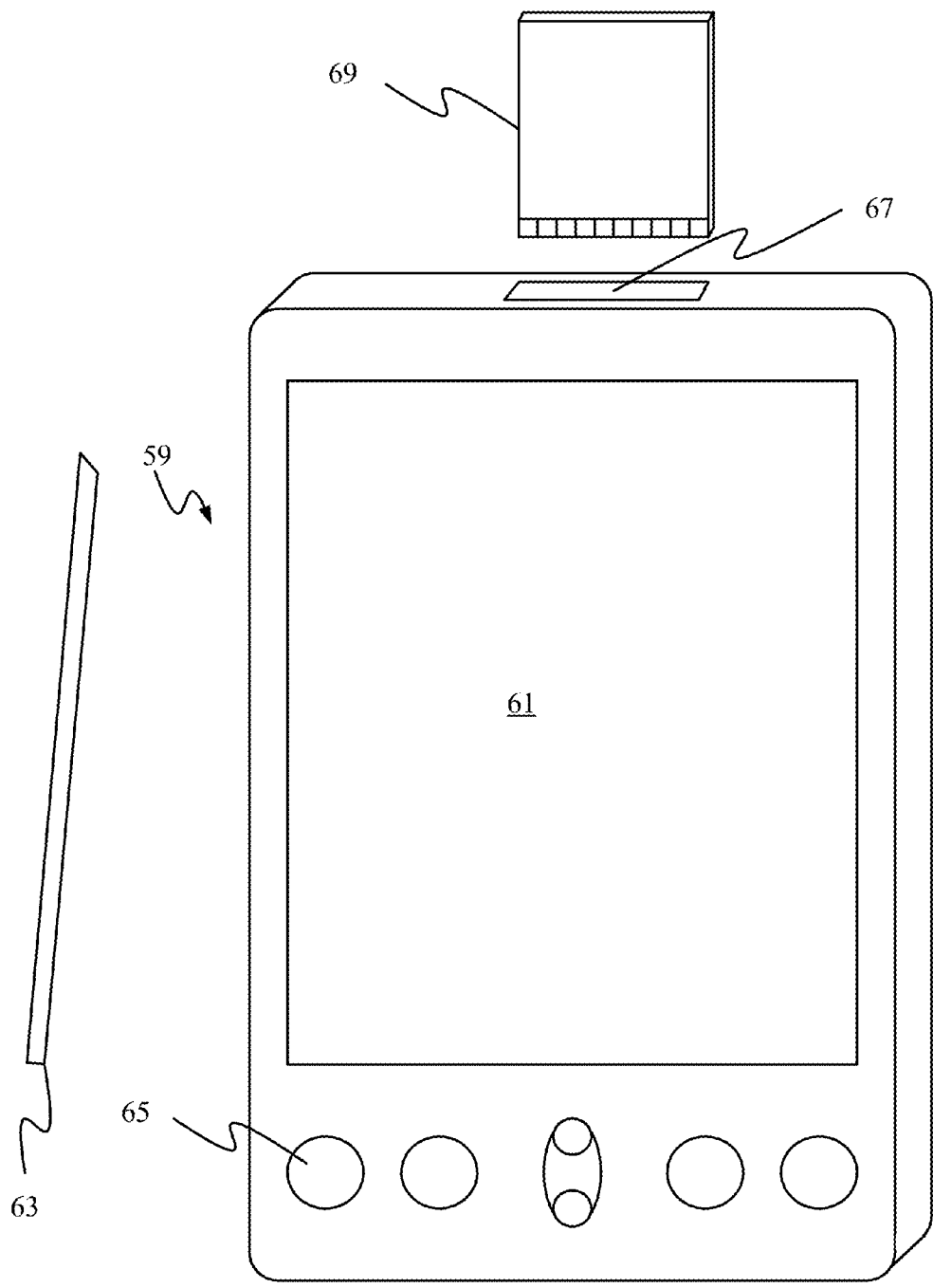

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
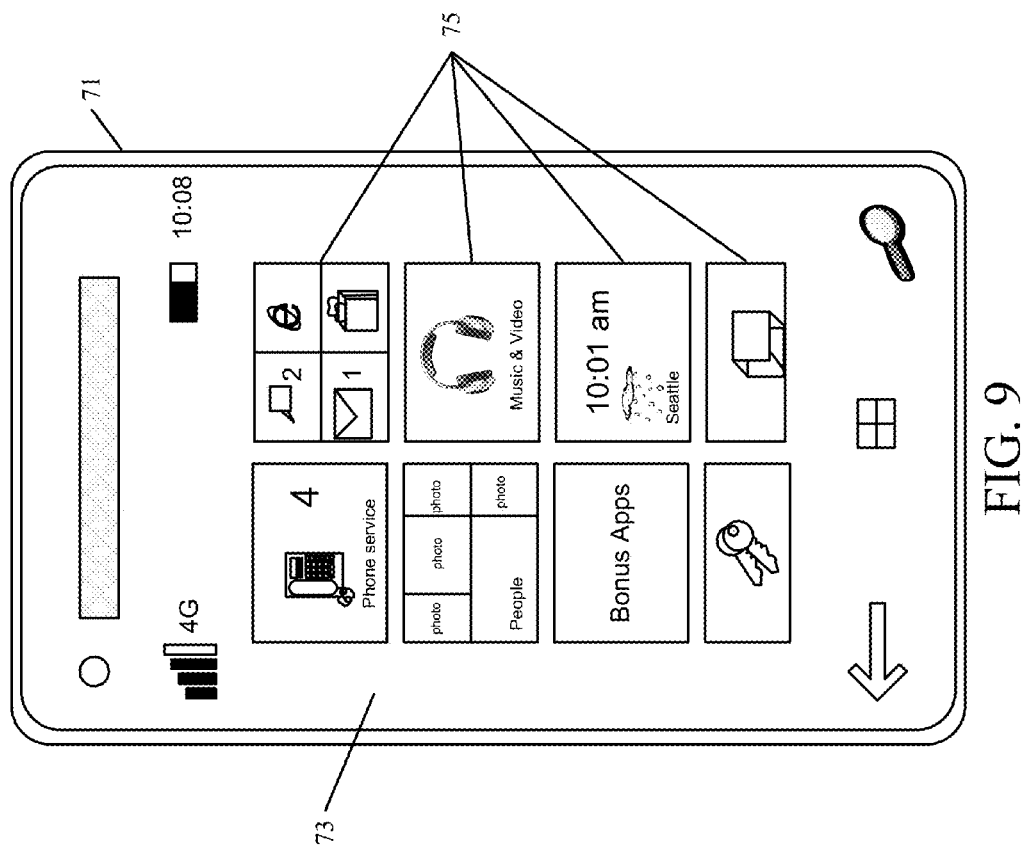
Figure 10:
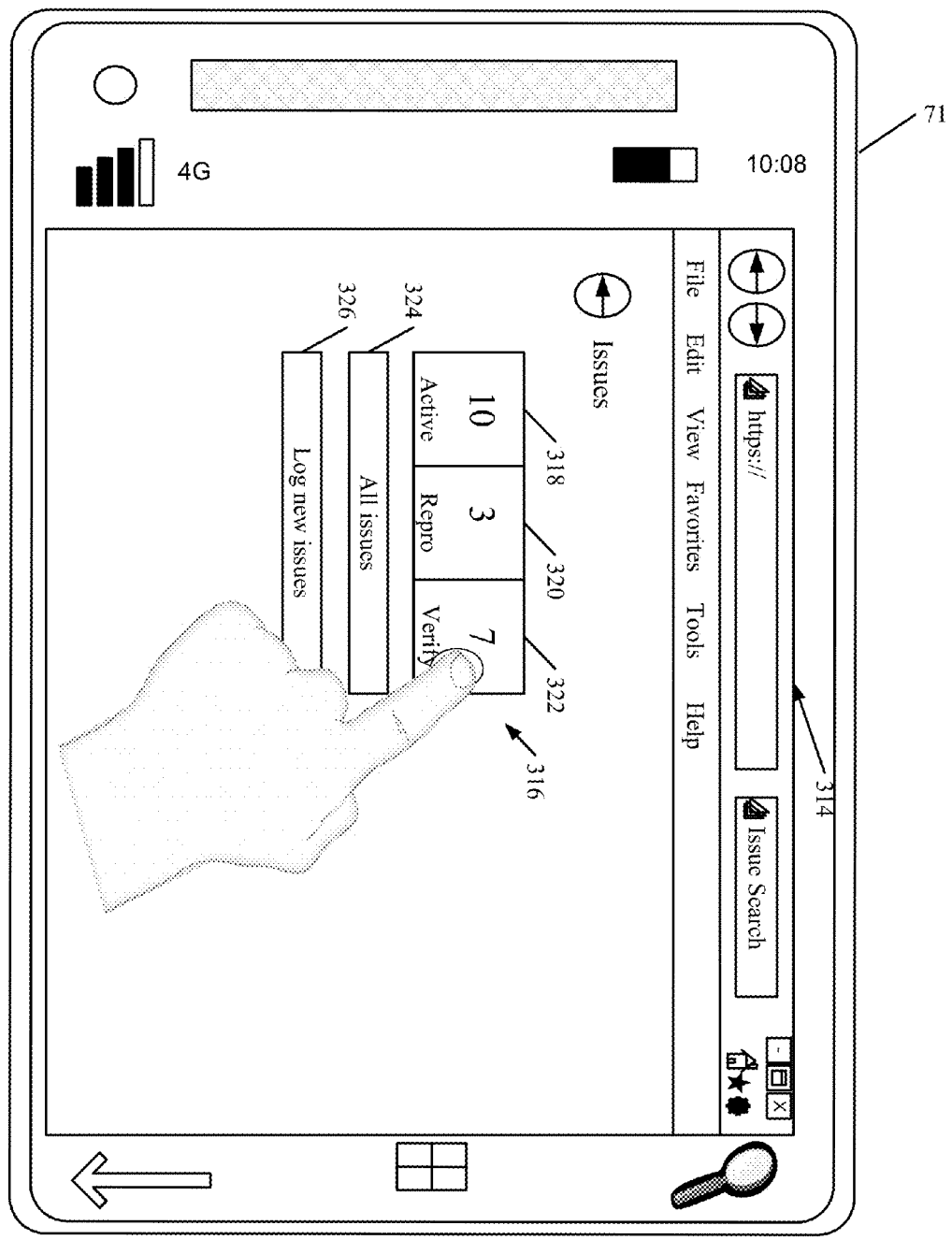

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows phone 71 with the display of FIG. 3V on it.

Note that other forms of the devices 16 are possible.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 126, 147 or 154), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    generating a representation of an issue description user interface display with an issue description user input mechanism configured to receive a user issue description input from a user of a deployed computer system;
    receiving an indication of the user issue description input indicative of a technical issue in the deployed computer system;
    receiving deployed environment data indicative of an environment of the deployed computer system;
    generating a diagnostic environment based on the deployed environment data, the diagnostic environment corresponding to the environment of the deployed computer system;
    after generating the diagnostic environment, generating a representation of a user reproduction display configured to receive a user reproduction input from the user of the deployed computer system;
    receiving an indication of the user reproduction input;
    based on the indication of the user reproduction input, reproducing the technical issue in the diagnostic environment; and
    receiving a modification input indicative of a fix for the technical issue in the diagnostic environment.

2. The computer-implemented method of claim 1, wherein receiving a modification input comprises receiving an indication of a developer input, from a developer, indicative of the fix.

3. The computer-implemented method of claim 2, and further comprising:
    recording the user reproduction input for review by the developer.

4. The computer-implemented method of claim 1 and further comprising:
    receiving an indication of a user input, from the user, confirming that the technical issue was reproduced in the diagnostic environment.

5. The computer-implemented method of claim 1 wherein generating a diagnostic environment comprises:
    generating a computer system instance that is a reproduction of the environment of the deployed computer system.

6. The computer-implemented method of claim 5 and further comprising:
    generating a user application input mechanism that receives user inputs, from the user, to apply the fix to the diagnostic environment.

7. The computer-implemented method of claim 6 and further comprising:
    generating a user verification input mechanism that receives a user verification input, from the user, verifying whether the fix addresses the technical issue in the diagnostic environment; and
    storing the fix for application to the deployed computer system.

8. The computer-implemented method of claim 7 wherein generating the user verification input mechanism comprises:
    generating a representation of a screen that mimics screen in the deployed computer system; and
    receiving an indication of a user input, from the user, performing a step in the diagnostic environment during which the technical issue is encountered in the deployed computer system.

9. The computer-implemented method of claim 5 wherein generating a diagnostic environment comprises:
    provisioning a virtual computer system instance based on the deployed environment data;
    mapping the user to the virtual computer system instance so the user has access to the virtual computer system instance; and
    mapping technical support personnel to the virtual computer system instance so the technical support personnel have access to the virtual computer system instance.

10. The computer-implemented method of claim 1 wherein receiving deployed environment data comprises:
    receiving an operating system identification identifying an operating system in the deployed computer system;
    receiving a deployed computer system version number;
    receiving an indication of updates installed on the deployed computer system; and
    receiving an indication of fixes installed on the deployed computer system.

11. The computer-implemented method of claim 1 and further comprising:
    after receiving an indication of the user issue description input and the deployed environment data, querying a fix service to identify potentially relevant fixes that can be applied to the deployed computer system;
    generating a representation of user interface elements for the potentially relevant fixes for application by the user to the deployed computer system; and
    if the user applies one of the potentially relevant fixes to the deployed computer system, sending the user a link to return to a process flow for addressing the technical issue if the applied potentially relevant fix does not address the technical issue.

12. A computing system, comprising:
    an issue reporting component configured to receive an indication of a user input, from a user of a deployed computing system instance, describing a technical issue encountered in the deployed computing system instance;
    a virtual environment service configured to generate a virtual computing system instance, based on environment data collected from the deployed computing system instance, the virtual computing system instance corresponding to the deployed computing system instance;
    a virtual machine control system configured to reproduce the technical issue on the virtual computing system instance, receive a modification input indicative of a fix for the technical issue on the virtual computing system instance, and apply the fix to the virtual computing system instance, using a computer processor of the computing system; and a verification component configured to receive an indication of a user verification input, from the user, verifying that the fix addresses the technical issue on the virtual computing system instance.

13. The computing system of claim 12, wherein the virtual machine control system is configured to receive a reproduction user input, from the user, reproducing the technical issue, and wherein the virtual machine control system is configured to apply the fix by generating a representation of a user application input mechanism that receives a user input, from the user, to apply the fix to the diagnostic environment.

14. The computing system of claim 12, wherein the virtual environment service comprises:

a virtual machine generator configured to generate the virtual computing system instance that mimics operation of the deployed computing system instance.

15. The computing system of claim 14 wherein the virtual environment service further comprises:

a mapping generator configured to generate a mapping between the user and the virtual computing system instance and between a developer and the virtual computing system instance so the user and the developer have access to the virtual computing system instance in the virtual machine control system.

16. A computer-implemented method comprising:

generating a representation of an issue description user interface display with an issue description user input mechanism configured to receive a user issue description input, from a user of a deployed computer system instance;

receiving an indication of the user issue description input indicative of a technical issue in the deployed computer system instance;

receiving deployed environment data indicative of an environment of the deployed computer system instance;

generating a diagnostic environment, based on the deployed environment data, corresponding to the environment of the deployed computer system instance, wherein the diagnostic environment comprises functionality that mimics functionality of the deployed computer system instance;

reproducing the technical issue in the diagnostic environment;

generating a representation of a user reproduction display configured to receive a user reproduction input, from the user of the deployed computer system instance;

receiving an indication of the user reproduction input verifying that the technical issue was reproduced in the diagnostic environment; and receiving a modification input indicative of a fix for the technical issue in the diagnostic environment.

17. The computer-implemented method of claim 16 and further comprising:

generating a representation of a user application input mechanism that receives a user input, from the user, to apply the fix to the diagnostic environment.

18. The computer-implemented method of claim 17 and further comprising:

generating a representation of a user verification input mechanism that receives a user verification input, from the user, verifying whether the fix addresses the technical issue in the diagnostic environment.

19. The computer-implemented method of claim 18 wherein generating a representation of the user verification input mechanism comprises:

generating a representation of a screen that mimics a screen in the deployed computer system instance; and receiving an indication of a user input performing a step in the diagnostic environment corresponding to a step in the deployed computer system instance during which the technical issue is encountered in the deployed computer system instance.

20. The computer-implemented method of claim 16 and further comprising;

after receiving the user description inputs and the deployed environment data, querying a fix service to identify potentially relevant fixes that can be applied to the deployed computer system instance to address the technical issue;

generating a representation of a user interface element for the potentially relevant fixes for application by the user to the deployed computer system instance; and if the user applies one of the potentially relevant fixes to the deployed computer system instance, sending the user a link to return to a process flow for addressing the technical issue if the applied potentially relevant fix does not address the technical issue.

* * * * *